US012717500B2

United States Patent
(12) United States Patent
Kang et al.

(10) Patent No.: US 12,717,500 B2
(45) Date of Patent: Aug. 25, 2026

(54) KEY SORTING BETWEEN KEY-VALUE SOLID STATE DRIVES AND HOSTS

(71) Applicant: Samsung Electronics Co., Ltd., Suwon-si (KR)

(72) Inventors: Yangwook Kang, San Jose, CA (US); Pratik Mishra, San Jose, CA (US); Yang Seok Ki, Palo Alto, CA (US)

(73) Assignee: SAMSUNG ELECTRONICS CO., LTD. (KR)

(*) Notice: Subject to any disclaimer, the term of this patent is extended or adjusted under 35 U.S.C. 154(b) by 711 days.

(21) Appl. No.: 17/029,026

(22) Filed: Sep. 22, 2020

(65) Prior Publication Data

US 2022/0011948 A1 Jan. 13, 2022

Related U.S. Application Data

(60) Provisional application No. 63/049,619, filed on Jul. 8, 2020.

(51) Int. Cl.
*G06F 3/06* (2006.01)
*G06F 16/22* (2019.01)

(52) U.S. Cl.
CPC .......... *G06F 3/0622* (2013.01); *G06F 3/0655* (2013.01); *G06F 3/0679* (2013.01); *G06F 16/22* (2019.01)

(58) Field of Classification Search
CPC ...... G06F 16/22; G06F 3/0622; G06F 3/0655; G06F 3/0679
See application file for complete search history.

(56) References Cited

U.S. PATENT DOCUMENTS

| | | | | |
|---|---|---|---|---|
| 1,184,184 | A | 5/1916 | Krieger | |
| 8,806,160 | B2 | 8/2014 | Colgrove et al. | |
| 9,235,622 | B2 | 1/2016 | Shuf et al. | |
| 9,442,972 | B2 | 9/2016 | Perez et al. | |
| 9,619,499 | B2 | 4/2017 | Asaad et al. | |
| 9,703,788 | B1 | 7/2017 | Bent et al. | |
| 10,318,491 | B1 * | 6/2019 | Graham | G06F 16/182 |
| 10,496,371 | B2 | 12/2019 | Li et al. | |
| 10,783,186 | B2 | 9/2020 | Boles et al. | |
| 11,003,625 | B2 | 5/2021 | Duan et al. | |

(Continued)

FOREIGN PATENT DOCUMENTS

| | | |
|---|---|---|
| CN | 102436420 A | 5/2012 |
| CN | 110119425 A | 8/2019 |

(Continued)

OTHER PUBLICATIONS

European Office Action for Application No. 21184327.1, mailed Jun. 16, 2023.

*Primary Examiner* — Jensen Hu
(74) *Attorney, Agent, or Firm* — Renaissance IP Law Group LLP

(57) ABSTRACT

A Key-Value storage device is disclosed. The Key-Value storage device may include a first storage for data that is persistent. The Key-Value storage device 125) may also include a second storage for a main index structure to map a key to a location in the first storage. A controller may process a read request, a write request, or a delete request from a host using the first storage. A third storage may store a secondary index structure that stores the key, the secondary index structure being sorted.

20 Claims, 17 Drawing Sheets

(56) References Cited

U.S. PATENT DOCUMENTS

| | | | | |
|---|---|---|---|---|
| 2013/0275656 | A1* | 10/2013 | Talagala | G06F 12/0246 711/103 |
| 2014/0337375 | A1* | 11/2014 | Yue | G06F 16/2255 707/769 |
| 2014/0358949 | A1* | 12/2014 | Hu | G06F 16/2455 707/754 |
| 2015/0310053 | A1 | 10/2015 | Kim | |
| 2016/0321294 | A1* | 11/2016 | Wang | H04L 67/568 |
| 2017/0193041 | A1* | 7/2017 | Fuchs | G06F 16/21 |
| 2018/0253260 | A1* | 9/2018 | Marripudi | G06F 3/0611 |
| 2018/0267854 | A1* | 9/2018 | Ki | G11C 7/24 |
| 2019/0155959 | A1* | 5/2019 | Lee | G06F 3/0679 |
| 2020/0104047 | A1* | 4/2020 | Subbarao | G06F 3/064 |
| 2021/0216517 | A1* | 7/2021 | Graefe | G06F 16/2272 |
| 2021/0248107 | A1* | 8/2021 | Hou | G06F 3/0652 |
| 2021/0311877 | A1* | 10/2021 | Park | G06F 3/0661 |

FOREIGN PATENT DOCUMENTS

| | | | |
|---|---|---|---|
| JP | 2016524750 | A | 8/2016 |
| JP | 2018518733 | A | 7/2018 |
| KR | 20150122533 | A | 11/2015 |
| KR | 20190095089 | A | 8/2019 |
| TW | 201913416 | A | 4/2019 |
| WO | 2020055977 | A1 | 3/2020 |

* cited by examiner

User Interface
220
I/O Engine
225
215
Storage Device
125
Processor
110
Clock
205
Mem. Contr.
120
Memory
115
Network Connector
210
105

Secondary Index Structure (new)
535
Log Block
325
Processor
110
Secondary Index Structure (old)
805

KEY SORTING BETWEEN KEY-VALUE SOLID STATE DRIVES AND HOSTS

RELATED APPLICATION DATA

This application claims the benefit of U.S. Provisional Patent Application Ser. No. 63/049,619, filed Jul. 8, 2020, which is incorporated by reference herein for all purposes.

FIELD

The inventive concepts relate generally to storage devices, and more particularly to improved sorting of key in a Key-Value Solid State Drive (KV-SSD).

BACKGROUND

Key-Value Solid State Drives (KV-SSDs) store data (the "value" in Key-Value) at locations on the KV-SSDs. The locations are associated with a key (the "key" in Key-Value). When a KV-SSD receives a write request, the new key may be added to a structure that maps the key to the location where the data is stored. When a KV-SSD receives a read request, the KV-SSD uses this structure to locate where the data is stored, so that the data may be read and returned to the requesting machine. And when a KV-SSD receives a delete request, the KV-SSD updates this structure to remove the key from the structure.

A need remains to improve the management of the index structure for a KV-SSD.

BRIEF DESCRIPTION OF THE DRAWINGS

The drawings described below are examples of how embodiments of the inventive concept may be implemented, and are not intended to limit embodiments of the inventive concept. Individual embodiments of the inventive concept may include elements not shown in particular figures and/or may omit elements shown in particular figures. The drawings are intended to provide illustration and may not be to scale.

DETAILED DESCRIPTION

Figure 1:
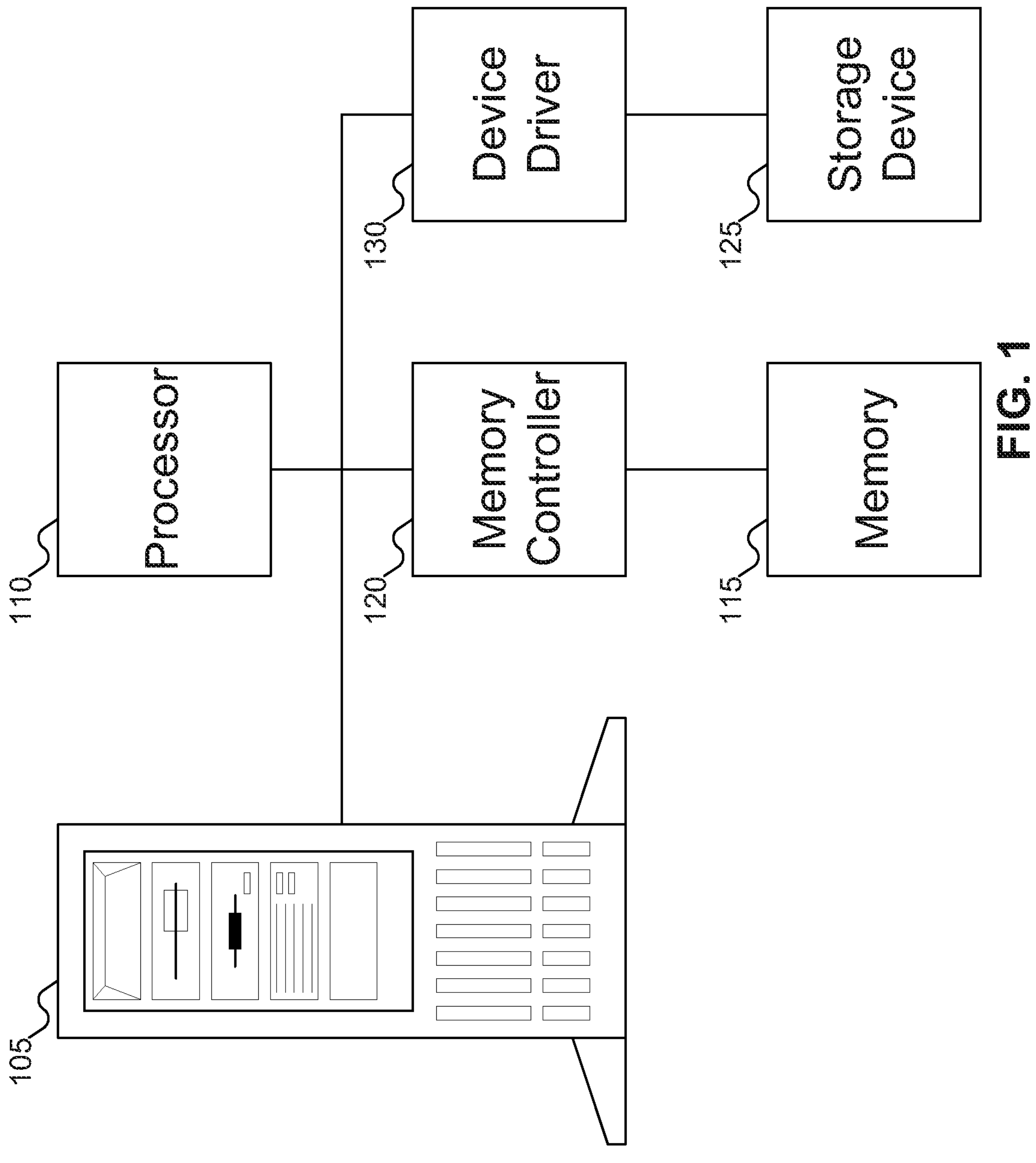
FIG. 1 shows a machine including a storage device equipped to support cooperative key sorting, according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Key-Value storage devices may use a main index structure to process various requests, such as write requests, read requests, or delete requests. Because these requests represent the majority of requests that may be received from requestors, updates to this structure may interfere with other operations, particularly input/output (I/O) operations. Put another way, when the main index structure is being updated, the Key-Value storage device may not be able to process write, read, or delete requests for other data stored in the Key-Value storage device. In addition, because this structure may be stored in flash storage just as with user data, updates to this structure may involve invalidating the existing structure and writing the updated structure to a new location in the flash storage. This process may result in an increase in the write amplification factor (WAF). On the other hand, since this structure is used by the KV-SSD, updates to this structure may not be deferred indefinitely.

In various aspects, range query may be a feature of Key-Value stores. In some Key-Value stores, to respond to a range query involves two steps: logging and merging (compaction). In the logging phase, Key-Value stores write non-sorted or partially sorted keys to Solid State Drives (SSDs), and in the merging phrase, the logged key lists are read and combined with a main index tree. Note that these operations may be performed by the Key-Value store even if no range query is pending.

However, it may be challenging for Key-Values SSDs (KV-SSDs) to support this processing internally due to limits on internal processing power. Logging may be implemented internally, but merging and sorting may be computationally expensive processes for devices. And while a general purpose processor (or hardware designed specifically for merging, such as a suitably configured Field Programmable Gate Array (FPGA) or Application-Specific Integrated Circuit (ASIC)) may be used, dedicating hardware to these specific tasks may add to the overall cost and/or complexity of the Key-Value store.

In some respects, KV-SSDs may provide relatively fast, scalable Key-Value pair management. But sorting incoming Key-Value pairs to support range queries may incur performance degradation. Updating the main index structure on demand is expensive, and does not scale well with the increasing number of keys. In some aspects, a two-step sorting technique may be used, which partially processes and stores incoming Key-Value pairs to storage devices and organize stored data in the background. But there may be some performance issues with this approach. Logging requires synchronous writes, which KV-SSDs may not offer. And merging updates the main index structure, interfering the processing of incoming input/output (I/O) requests.

To address these performance issues, logging may be offloaded to the KV-SSD, taking advantage of atomic I/O operations: the host may avoid performing logging or issuing a logging request to the KV-SSD. Merging may be performed by the host, with the processed results stored to the KV-SSD (or elsewhere) separately, and in another structure that does not interfere with the main index structure.

The KV-SSD may include a Key-Logger, which may write updated or deleted keys to persistent memory or storage media in a device. The KV-SSD may also support two commands: an iterate command that retrieves write buffers written or maintained by key logger, and a log-delete command that deletes the write buffers written or maintained by key logger. In addition, write and delete commands may be modified to support a new metadata field for key grouping.

This key group metadata may be used for logging and sorting: keys assigned to the same key group may be sorted together. If no key group metadata is specified, the KV-SSD may determine that all keys are in the same group.

This key group information may be passed by a write/delete Key-Value I/O command, which may be implemented on top of a native I/O command protocol, such as Non-Volatile Memory Express (NVMe). The key group information may be passed from optional fields in the specific I/O command protocol or encoded within a key itself. The Key-Value command handler may pass the key group metadata from write and delete commands to the key logger.

The key logger may store a key into a per-group write buffer, residing in persistent memory. This persistent memory may include non-volatile memory, byte-addressable Dynamic Random Access Memory (DRAM) (which may be battery-backed), byte-addressable non-volatile memory, and other forms. Each key log entry may contain the key (its length and key contents) and information about the key, such as an OPCODE (indicating write/delete) and optional metadata (such as group information).

If the remaining space of the persistent memory storing the write buffers is insufficient, the write buffers may be transferred to a persistent storage media such as flash memory. The locations of write buffers in flash memory may be maintained by a device. Write buffers may be assigned a range of logical block addresses (LBAs) in a memory, stored using a Key-Value pair for a write buffer in the persistent storage media, or stored in other ways. For example, a region in flash memory may be reserved for write buffers. The key logger may maintain the list of free LBAs in the region, and assign a write buffer using the free LBAs. This region may be reclaimed when the log-delete command is issued.

Another way to manage write buffers is to assign a unique key to a write buffer, and store it as a Key-Value pair in the main storage in flash memory. The key logger may maintain the list of assigned unique keys and return them upon an iterate command. When the host issues an iterate command, the key logger may return the key(s) for these write buffer(s), and the host may read the write buffers using a standard read request. Once the write buffer has been read from the main storage in flash memory, the host may issue a delete request for these key(s). Using this approach, the KV-SSD may not need a log-delete command (since the host may delete the write buffer(s) directly using a delete request and the assigned key).

The iterate command may retrieve the write buffers maintained or written by the key logger. The iterate command may be implemented in two ways: the iterate command may return the contents of the write buffers, or the iterate command may return the list of the unique identifiers (e.g., the key and the LBA) of the write buffers.

If the amount of data to be returned is too large for a single command, multiple iterate commands may be issued. An example implementation for an iterate command, using a pre-assigned range of LBAs, along with example code for a host to use this command, is shown in Table 1 below:

TABLE 1

```
Function iterate(start, end, max_lbas)
output = empty
```

TABLE 1-continued

```
    max = start + min(end−start, max_lbas)
While start < max
    output.append(read(start))
    start = start + 1
    return { start, output }
End
Start = 0
End = 10
Max = 5
While start != end
    start, output = iterate(start, end, max)
    process (output)
```

If the iterate command is used to access the contents of the write buffers, then a log-delete command may be issued upon completion of the iterate command to erase the write buffers. (If the iterate command returns identifiers (e.g., keys or LBAs) of the write buffers, the log-delete command may be omitted, since the host may erase the write buffers using a delete request and the keys assigned to the write buffers.

The merging process performs the following three tasks: read the write buffers; generate the sorted list of keys (and write them to the KV-SSD); and delete the write buffers. Reading the write buffers may be performed using the iterate command as described above.

To generate the sorted list of keys, the host may extract the key entries from the write buffers. The host may also load into memory index nodes that contain the key entries (read from the write buffers). The host may then insert new keys into the index nodes and remove deleted keys from the index nodes. The host may then write the updated metadata to the KV-SSD (but in a different structure than the main index structure).

Finally, to delete the write buffers, the host may issue a log-delete command to delete the write buffer(s) (or the host may use a delete request with the key(s) assigned to the write buffer(s) if the write buffer(s) are stored as Key-Value pairs on the KV-SSD).

To perform the merge itself, any desired sorted index data structure may be used, including, for example, B+-tree, B-tree, Skip List and others.

Because the sorted index structure may be using the write buffers (and/or the main index structure) if a power failure or a write failure occurs (the processed write buffers may be deleted when all metadata nodes are successfully written to KV-SSD), the sorted index structure is consistent.

To summarize, when the main index structure is used to store information about keys in a sorted manner, the main index structure may be updated multiple times in a manner that affects the entirety of the main index structure. While the main index structure is being updated, other I/O operations may be interrupted or delayed (since I/O operations may access the main index structure). In addition, KV-SSDs may perform multiple write operations to ensure data consistency. New keys may be written both to a log and to a temporary file (for example, as part of a write buffer).

By using a secondary index structure to store sorted key information instead of the main index structure, the KV-SSD may avoid having to update the main index structure, during which time I/O operations may be interrupted or delayed. In addition, because less data may be changed in the main index structure, the WAF for data stored on the KV-SSD may be reduced. Finally, fewer temporary copies of keys may be written to the storage device.

FIG. 1 shows a machine including a storage device equipped to support cooperative key sorting, according to an embodiment of the inventive concept. In FIG. 1, machine 105, which may also be termed a host, is shown. Machine 105 may include processor 110. Processor 110 may be any variety of processor. (Processor 110, along with the other components discussed below, are shown outside machine 105 for ease of illustration: embodiments of the inventive concept may include these components within machine 105.) While FIG. 1 shows a single processor 110 in machine 105, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Machine 105 may also include memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may also be any desired combination of different memory types. Machine 105 may also include memory controller 120, which may be used to manage access to memory 115.

Machine 105 may also include a storage device. Storage device 125 may be used to store data. Processor 110 may run device driver 130, which may support access to storage device 125. While embodiments of the inventive concept may focus on a Key-Value storage device, any desired storage device may be used, which may operate using any desired storage principle. Thus, the storage device may be a Solid State Drive (SSD), a hard disk drive, or any other desired storage device. While FIG. 1 shows only one storage device 125, embodiments of the inventive concept may support any number of installed storage devices in machine 105, which may differ from each other (or be similar or identical to each other) with respect to any specific individual elements.

A Key-Value storage device, such as storage device 125, may use keys to identify data rather than a logical block address (LBA). Unlike block-based storage, where data is expected to be written and read in units of a specific pre-defined size (for example, a page or a block), objects may conceivably be of any size. The size of an object stored on a Key-Value storage device may be bounded by the capacity of the Key-Value storage device. Thus, the size of an object may be smaller than a page or a block, or the size of an object may be larger than a page or a block. (While the size of a page or a block may still control how the object is stored, how storage is managed is separate from how objects may be written or read.)

Similarly, while block-based storage may expect an LBA to fit into a specific range of values (and therefore to use a specific pre-defined number of bits in an LBA), the key may conceivably be of any size, and may take on any desired value. Because the number of bits in the key may vary, Key-Value storage devices may be more flexible than block-based storage devices. But there are other considerations as well. For example, while LBAs as used by different applications may be unique, nothing prevents different applications from attempting to use the same key to write data. In such situations, the Key-Value storage device may return an error to the second application, informing that application that the key is already in use and so the value could not be written to the Key-Value storage device.

One type of request that may be received by a Key-Value store (such as Key-Value storage device 125) is called a range query. A range query may request information about keys that meet certain criteria. For example, a range query might ask for all keys associated with a value in a particular range, or for all keys present in the Key-Value store where the key itself lies in a certain range. Having keys in a sorted manner may expedite processing of such queries.

Key-Value storage device 125 may use a main index structure to store and manage Key-Value pairs. In some Key-Value SSDs, the main index structure may also keep such information about keys in a sorted manner. But every time a new key is written or an old key is deleted, such requests may affect the sort order of the keys. Thus, the entire main index structure might need to be updated when a key is written or deleted (and since Key-Value SSDs typically use flash storage, in-place modification is not possible, so the old main index structure is deleted and a new main index structure is written). It is desirable that the information stored in the main index structure be consistent: that is, data that is actually written to the Key-Value storage device should be reflected by the main index structure. Thus, Key-Value storage devices generally are not able to process Input/Output (I/O) requests when the main index structure is being updated. Thus, some Key-Value storage devices may be "blocked" from handling I/O requests while the main index structure is being updated, increasing the time required for the Key-Value SSD to respond to an I/O request.

In addition to the performance implications of updating the main index structure, since in-place modification of data is not supported by flash storage, updating the main index structure also increases the number of times blocks have been subject to program-erase cycles. Since cells in flash storage have a finite number of program-erase cycles before their reliability may not be guaranteed, updating the main index structure may lead the Key-Value storage device being worn out earlier. This consequence is referred to as the write amplification factor (WAF) of data written to Key-Value storage device 125.

One solution to these problems would be to delay or avoid updating the main index structure. But since the main index structure may be used to handle I/O requests, updating the main index structure may not be deferred indefinitely.

This solution also assumes that a write-ahead log may be used to ensure that the data is consistent in the main index structure. But if Key-Value storage device 125 may support atomic write operations, then the use of a write-ahead log may be omitted. The update of the main index structure to include a new Key-Value pair (although not necessarily in a sorted order) may be performed using an atomic operation, which ensures that either the main index structure is updated completely or no update is performed.

In embodiments of the inventive concept, a secondary index structure may be introduced. This secondary index structure may mirror (to some extent) the information in the main index structure, but the keys stored as managed by the secondary index structure may be sorted. In some embodiments of the inventive concept, the secondary index structure may include the keys from the key-value pairs but not the (physical) location on Key-Value storage device 125 where the data is stored. This fact may be a consequence of key logging being performed in parallel with (or before) the writing of the key-value pair to the actual storage in Key-Value storage device 125: if the location is not yet known, the location may not be logged, and thus may not be included in the secondary index structure. In other embodiments of the inventive concept, the location on Key-Value storage device 125 where the value is stored may be included in the secondary index structure, either by having the location be added to the information logged during key logging, or by accessing the location from the main index structure or the flash translation layer.

Using a secondary index structure helps to address the problems associated with using the main index structure to store sort information about the keys. Updates to the main index structure are fast: new keys may be written to the end of the main index structure and deleted keys may just be marked as no longer valid. And the secondary index structure may be updated without interfering with the use of the main index structure, avoiding any performance issues due to I/O requests being delayed.

While using a secondary index structure may use additional space (depending on the information stored in the secondary index structure, the secondary index structure might be of comparable size to the main index structure, meaning that the amount of storage needed to store the two index structures is approximately double that for just the main index structure), as noted above there are benefits to using the secondary index structure: the main index structure may still be used even while the secondary index structure is being updated.

In addition, machine 105 may store the secondary index structure in memory 115, and may handle range queries using the secondary index structure. Thus, the secondary index structure might not be stored on Key-Value storage device 125. The secondary index structure might be stored on Key-Value storage device 125 to avoid the need to recreate it later (which would involve reading the main index structure and sorting that information, which may be a time-expensive process if there are thousands or millions of keys in the main index structure). But the secondary index structure may not be updated as stored on Key-Value storage device 125 as frequently as the main index structure might be updated, thereby reducing the WAF.

Because the secondary index structure is updated using a merge-sort process based on information stored in log blocks about updates to Key-Value storage device 125, information in the secondary index structure may differ from information in the main index structure. That is, the main index structure may include keys not yet added to the secondary index structure, and may omit keys not yet deleted from the secondary index structure. In short, the number of keys in the secondary index structure (which may be zero or more over the life of Key-Value storage device 125) may differ from the number of keys in the main index structure.

The secondary index structure may use any desired data structure(s). Example data structures that may be used may include a B+-tree, a B-tree, a slotted page, or a Skip List. In addition, information about the keys (and other information) stored in the data structure may be stored in a slotted page (which may be used to store keys of varying sizes in an efficient manner).

Although FIG. 1 depicts machine 105 as a server (which could be either a standalone or a rack server), embodiments of the inventive concept may include machine 105 of any desired type without limitation. For example, machine 105 could be replaced with a desktop or a laptop computer or any other machine that may benefit from embodiments of the inventive concept. Machine 105 may also include specialized portable computing machines, tablet computers, smartphones, and other computing machines. In addition, an application that may be accessing data from storage device 125 may located in another machine, separate from machine 105 and accessing machine 105 via a network connection traversing one or more networks of any types (wired, wireless, global, etc.).

Figure 2:
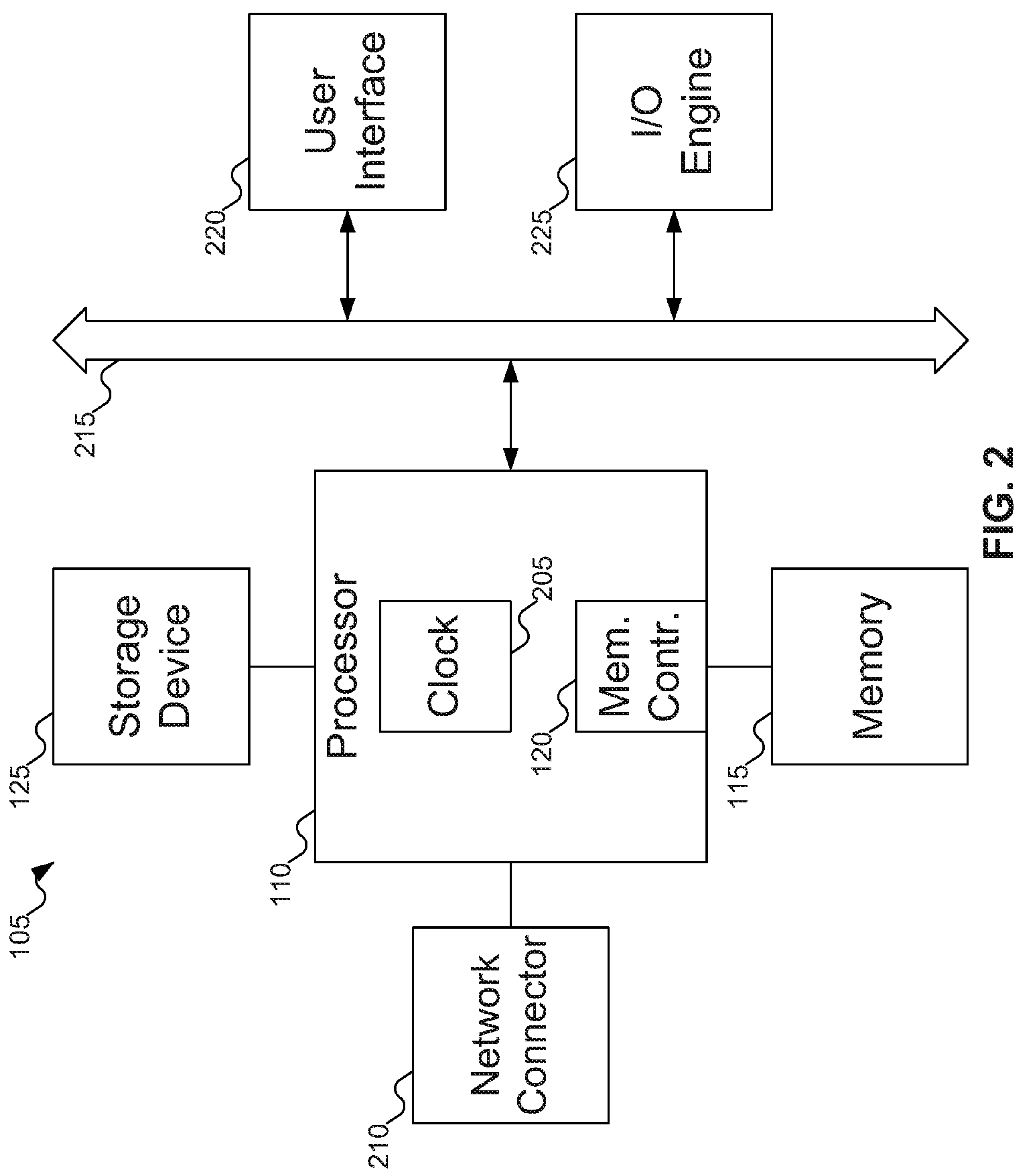
FIG. 2 shows additional details of the machine of FIG. 1, according to embodiments of the inventive concept.

FIG. 2 shows additional details of machine 105 of FIG. 1, according to embodiments of the inventive concept. In FIG. 2, typically, machine 105 includes one or more processors 110, which may include memory controllers 120 and clocks 205, which may be used to coordinate the operations of the components of device 105. Processors 110 may also be coupled to memories 115, which may include random access memory (RAM), read-only memory (ROM), or other state preserving media, as examples. Processors 110 may also be coupled to storage devices 125, and to network connector 210, which may be, for example, an Ethernet connector or a wireless connector. Processors 110 may also be connected to buses 215, to which may be attached user interfaces 220 and Input/Output interface ports that may be managed using Input/Output engines 225, among other components.

Figure 3:
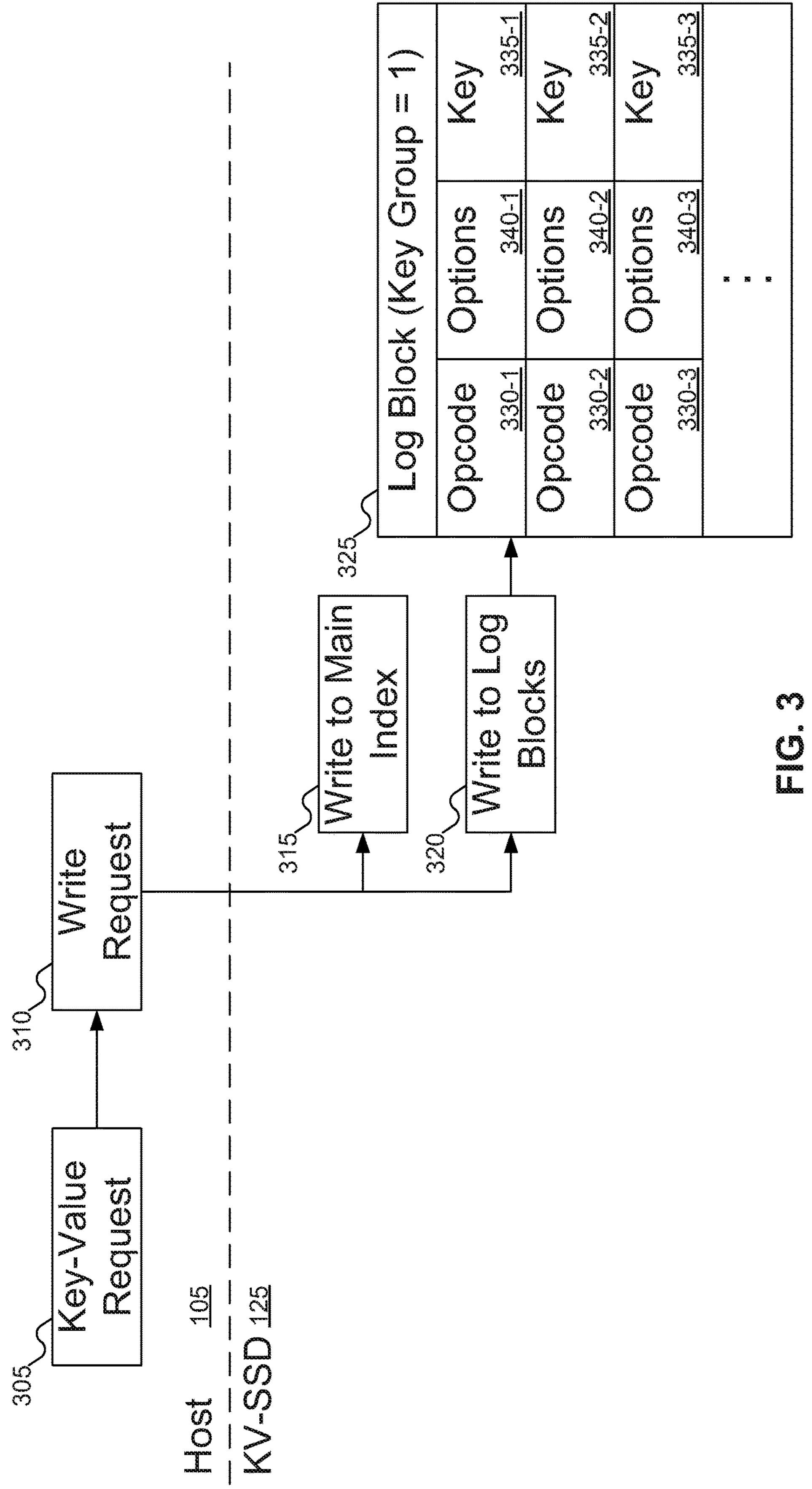
FIG. 3 shows operations involved in performing key logging, according to embodiments of the inventive concept.

FIG. 3 shows operations involved in performing key logging, according to embodiments of the inventive concept. In FIG. 3, host 105 may issue Key-Value request 305. (In practice, Key-Value request 305 may issue from an application running on host 105: for purposes of this discussion, distinctions between host 105 and an application that may be running on host 105 may be ignored.) As a result of Key-Value request 305, host 105 may issue write request 310, which may be sent to Key-Value storage device 125. Key-Value storage device 125 may then perform two operations: the Key-Value pair that is the subject of write request 310 may be written to the main index structure (operation 315), and the operation may be written to a log block (operation 320), such as log block 325 (which may also be called a log book, and which may be used similarly to a write log or a write buffer). Operation 315 may update the main index structure may be used by Key-Value storage device 125 to store the key (and associate the value's location in the storage with the key, so that the value may be later retrieved or deleted).

Operation 320 may store information about write request 310 in log block 325. This stored information may include operation (or opcode) 330-1 (which may indicate that the request was to write a new Key-Value pair to Key-Value storage device 125 or to update a value associated with an existing key to a new value). This stored information may also include key 335-1, indicating what key was affected by the request.

Log block 325 may also store additional information, labeled as options 340-1 (which may also be termed metadata). This additional information may be thought of as metadata for the request. Examples of such metadata may include metadata relating to the value in the Key-Value pair, the size of the key or the value, and other metadata. Options 340-1 may be included as options or metadata that are part of write request 310, or options 340-1 may be derived from write request 310.

Another example of metadata that may be used is key group metadata. Key group metadata may be used to associate a particular request with a key group. By grouping keys together, keys may be organized in alternative arrangements.

As an example of how key groups may be used, consider a scenario where a user stores three different types of data on Key-Value storage device 125: ordinary data and two types of metadata. By assigning each type of data to a different key group, requests that involve each type of data may be grouped together. This arrangement permits the keys (when sorted into the secondary index structure, as described further with reference to FIGS. 4, 7-8, 12-14, and 15) to be divided into different structures for different key groups. For example, log block 325 is shown as associated with key group 1: requests related to other key groups may be logged into other log blocks associated with the other key groups. Thus, while FIG. 3 shows only one log block 325, embodiments of the inventive concept may include any number (zero or more) log blocks (although zero log blocks might represent a situation where the secondary index structure is up-to-date, which might not occur that frequently).

Host 105 may also issue requests that do not need to be logged. For example, Key-Value storage device 125 may be used to store temporary files, journaling information, or metadata. Objects representing these data may not need to be sorted into the secondary index structure. The key group metadata may be used to identify keys that should not be logged for later merging into the secondary index structure.

Log block 325 is shown as including multiple tuples. Log block 325 may include multiple tuples because there may be multiple requests logged in between updates of the secondary index structure. Thus, opcode 330-1, key 335-1, and options 340-1 may represent information associated with one request, opcode 330-2, key 335-2, and options 340-2 may represent information associated with a second request, and opcode 330-3, key 335-3, and options 340-3 may represent information associated with a third request. While FIG. 3 shows information relating to only three requests in log block 325, embodiments of the inventive concept may store information relating to any number (zero or more) of requests in log block 325.

Finally, FIG. 3 is described with reference to write request 310. But embodiments of the inventive concept may extend to log information regarding other requests. For example, in the simplest implementation, a Key-Value storage device may offer three basic commands: GET (read data from the Key-Value storage device), PUT (write data to the Key-Value storage device), and DELETE (remove data from the Key-Value storage device). While the above description uses GET, PUT, and DELETE to identify these commands, embodiments of the inventive concept may include Key-Value storage devices that use different names (opcodes) for these commands. A GET command typically does not modify data on the Key-Value storage device, but PUT and DELETE commands may modify data on the Key-Value storage device. Thus, a DELETE command may result in operations like those shown in FIG. 3, just like a PUT command.

Further, while GET, PUT, and DELETE represent the central commands that may be processed by a Key-Value storage device, embodiments of the inventive concept may extend to Key-Value storage devices that offer additional commands. Any such commands that might affect information stored in the secondary index may be result in the operations like those shown in FIG. 3.

Figure 4:
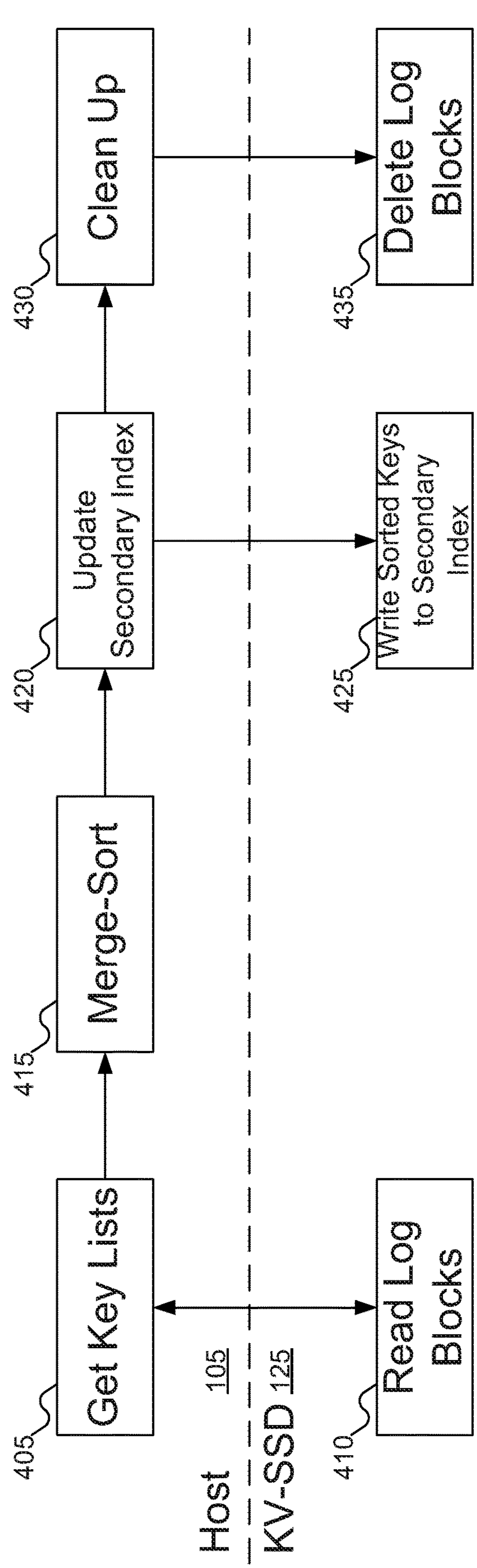
FIG. 4 shows operations involved in performing merging keys, according to embodiments of the inventive concept.

FIG. 4 shows operations involved in performing merging keys, according to embodiments of the inventive concept. To merge new key information into the secondary index structure, host 105 may request the list of keys that have been modified (that is, written to or deleted from) on Key-Value storage device 125 (shown operation 405). Key-Value storage device 125 may then provide a list of the keys that have been so modified since the last time the secondary index structure was updated (shown as operation 410). For example, this list of keys may include information from log block 325 of FIG. 3. Once host 105 has received the list of keys that have been updated since the last time the secondary index structure was updated, host 105 may perform a merge sort (shown as operation 415). This operation may involve updating the secondary index structure in memory 115 of FIG. 1.

Host 105 may then update the secondary index structure as stored on Key-Value storage device 125 (operation 420). When host 105 sends a request to update the secondary index structure to Key-Value storage device 125, Key-Value storage device 125 may then write the sorted keys to the secondary index structure (shown as operation 425). Finally, host 105 may send a request to clean up Key-Value storage device 125 (shown as operation 430). This operation may involve Key-Value storage device 125 deleting log block 325 of FIG. 3 (or at least deleting the data from log block 325 of FIG. 3, potentially leaving log block 325 of FIG. 3 to log future updates to the Key-Value information stored on Key-Value storage device 125).

Figure 5:
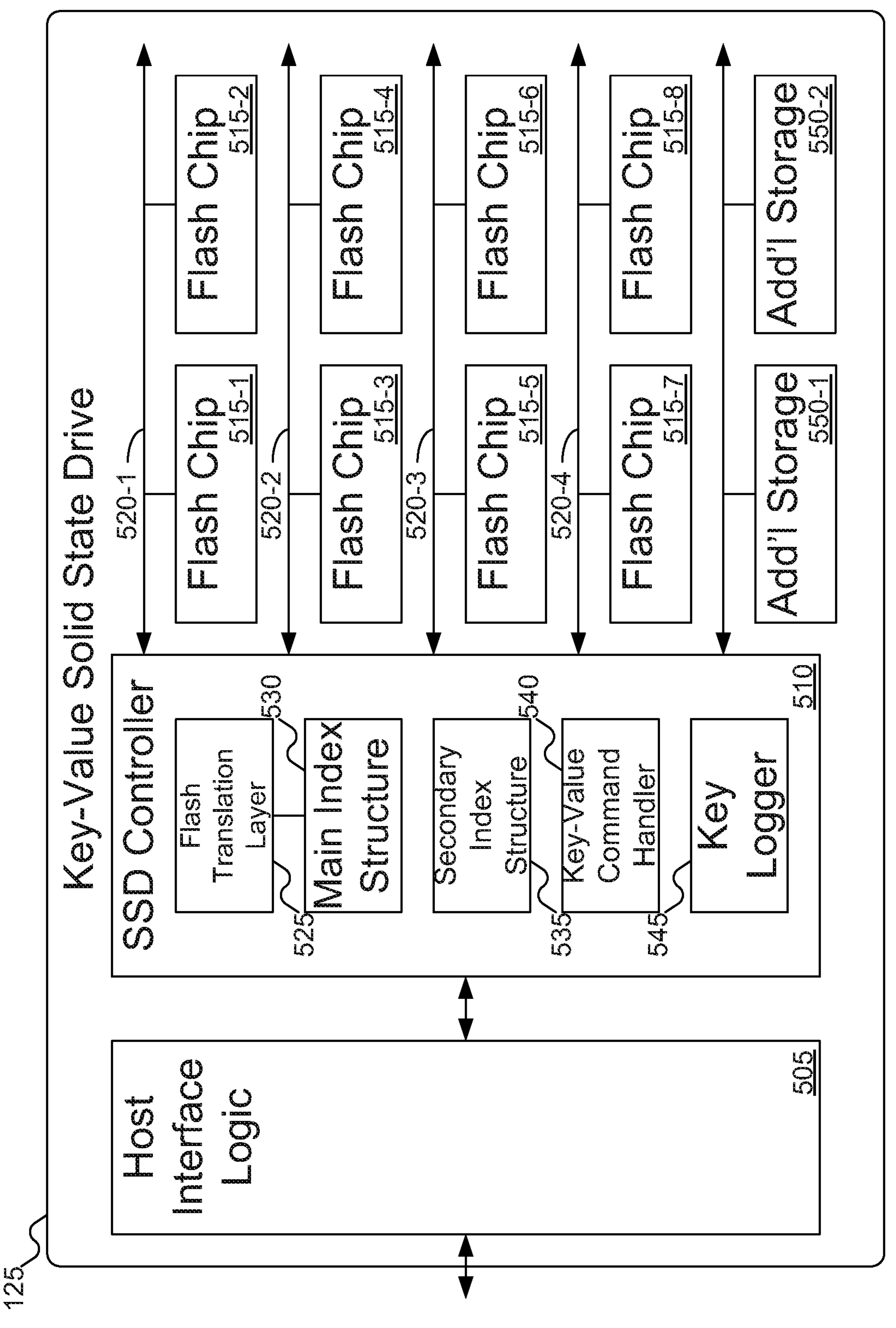
FIG. 5 shows details of the storage device of FIG. 1, according to embodiments of the inventive concept.

FIG. 5 shows details of storage device 125 of FIG. 1, according to embodiments of the inventive concept. In FIG. 5, KV-SSD 125 may include host interface 505 (which may also be termed a host interface logic, or HIL), SSD controller 510, and various flash memory chips 515-1 through 515-8 (also termed flash memory storage), which may be organized into various channels 520-1 through 520-4. Host interface logic 505 may manage communications between KV-SSD 125 and other components (such as processor 110 of FIG. 1). In some embodiments of the inventive concept, KV-SSD 125 may also support its own network connection (as opposed to passing through a network interface that is part of machine 105 of FIG. 1): in such embodiments of the inventive concept, host interface logic 505 may also manage communications with devices remote from KV-SSD 125: that is, devices that are not considered part of machine 105 of FIG. 1, but in communication with KV-SSD 125. These communications may include read requests to read data from KV-SSD 125, write requests to write data to KV-SSD 125, and delete requests to delete data from KV-SSD 125. Host interface logic 505 may manage an interface across only a single port, or it may manage interfaces across multiple ports. Alternatively, KV-SSD 125 may include multiple ports, each of which may have a separate host interface logic 505 to manage interfaces across that port. Embodiments of the inventive concept may also mix the possibilities (for example, an SSD with three ports might have one host interface logic to manage one port and a second host interface logic to manage the other two ports). To support direct communication with remote devices over a network, HIL 505 may include an Ethernet component (not shown in FIG. 5) or some equivalent network communication component.

SSD controller 510 may manage the read and write operations, along with garbage collection and other operations, on flash memory chips 515-1 through 515-8 using a flash memory controller (not shown in FIG. 5). SSD controller 510 may include flash translation layer 525, main index structure 530, secondary index structure 535, Key-Value command handler 540, and key logger 545. SSD controller 510 may be implemented using hardware in some form: for example, as a custom controller for KV-SSD 125 such as an Application-Specific Integrated Circuit (ASIC), a suitably configured Field Programmable Gate Array (FPGA), or a general purpose processor of some sort (such as a central processing unit (CPU), a graphics processing unit (GPU), or a general purpose GPU (GPGPU)) with appropriate software, among other possibilities.

Flash translation layer 525, which may also be termed an object translation layer, may manage translation between logical data identifiers—that is, keys of Key-Value pairs—as used by machine 105 of FIG. 1 and the physical locations in flash chips 515-1 through 515-8 where the values identified by the logical data identifiers are actually stored. In some embodiments of the inventive concept, flash translation layer 525 may include main index structure 530 (as shown by the line connecting flash translation layer 525 and main index structure 530) and/or secondary index structure 535; in other embodiments of the inventive concept, main index structure 530 and/or secondary index structure 535 may be separate from flash translation layer 525.

Main index structure 530 and secondary index structure 535 have been discussed above, and will not be repeated here. Key value command handler 540 may receive requests (also called commands) from host 105 of FIG. 1 (or from other machines that are remote from KV-SSD 125) and process the requests. Aside from reading, writing, and deleting data from flash chips 515-1 through 515-8, Key-Value command handler 540 may be responsible for (or assist in) updating main index structure 530, as well as passing information to key logger 545. Key value command handler 540 may also be adapted to process additional commands used specifically for the collaborative key sorting, which may include reading information about requests from log block 325 of FIG. 3 and/or deleting such requests from log block 325 of FIG. 3. Key logger 545 may store information about requests in log block 325 of FIG. 3. Key logger 545 may also include additional information not included in the requests: for example, the (physical) location where the value is stored in flash memory chips 515-1 through 515-8. In some embodiments of the inventive concept, key logger 545 may wait to store the information in log block 325 of FIG. 3 until all the information to be logged is available. Key value command handler 540 and key logger 545 are discussed further with reference to FIG. 6 below.

While FIG. 5 shows SSD controller 510 as including flash translation layer 525, main index structure 530, secondary index structure 535, Key-Value command handler 540, and key logger 545, embodiments of the inventive concept may locate these modules in any desired locations. Embodiments of the inventive concept may also locate these modules within different portions of KV-SSD 125: for example, none of these modules might be within SSD controller 510. In particular, KV-SSD 125 may include additional storage elements 550-1 and 550-2, which may be used to store main index structure 530, secondary index structure 535, and other information, such as log block 325 of FIG. 3. Additional storage elements 550-1 and 550-2 may be "reserved": that is, not available for storage of user data like flash chips 515-1 through 515-8. Alternatively, some or all of these components (for example, flash translation layer 525, main index structure 530, and/or secondary index structure 535) may be stored in flash memory chips 515-1 through 515-8.

Additional storage elements 550-1 and 550-2 may be implemented using any desired hardware. For example, additional storage elements 550-1 and 550-2 may be implemented using non-volatile storage (such as NAND flash storage, like flash chips 515-1 through 515-8), battery-backed volatile storage (such as some form of battery-backed RAM), or volatile storage without a battery backup (although in the latter case the information stored in the additional storage elements may be data that does not need to be persisted or may be recreated from other persistent data, in case of a power interruption causing loss of data). Additional storage elements 550-1 and 550-2 may store data using block-addressable storage, byte-addressable storage, or Key-Value storage. In addition, additional storage elements 550-1 and 550-2 may be of different varieties, both in the hardware used to store data and in the manner in which that data may be addressed. Finally, while FIG. 5 shows only two additional storage elements 550-1 and 550-2, there may be any number (zero or more) of such additional storage elements.

Key-Value storage device 125 may also include additional storage not shown in FIG. 5, such as additional volatile storage (which may be a variety of RAM, for example) or additional non-volatile storage. Main index structure 530 may be loaded into this additional storage, with updates to main index structure 530 performed in this additional storage. Main index structure 530 may then be flushed back to the main storage (for example, flash chips 515-1 through 515-8) as appropriate. For example, main index structure 530 might be flushed to the main storage after every change to main index structure 530. Or, main index structure 530 might be written to the main storage when host 105 of FIG. 1 performs the merge operation on secondary index structure 535 (with log block 325 of FIG. 3 potentially acting as a log of updates to main index structure as well in case updates to main index structure 530 are lost for some reason). Key-Value storage device 125 may also partially load main index structure 530 into this additional storage if the entirety of main index structure 530 is too large to load into this additional storage, with updates written back to Key-Value storage device 125 as appropriate or when a different portion of main index structure 530 is to be loaded into the additional storage.

While FIG. 5 shows KV-SSD 125 as including eight flash memory chips 515-1 through 515-8 organized into four channels 520-1 through 520-4, embodiments of the inventive concept may support any number of flash memory chips organized into any number of channels. Similarly, while FIG. 5 shows the structure of a SSD, other storage devices (for example, hard disk drives) may be implemented using a different structure, but with similar potential benefits.

Figure 6:
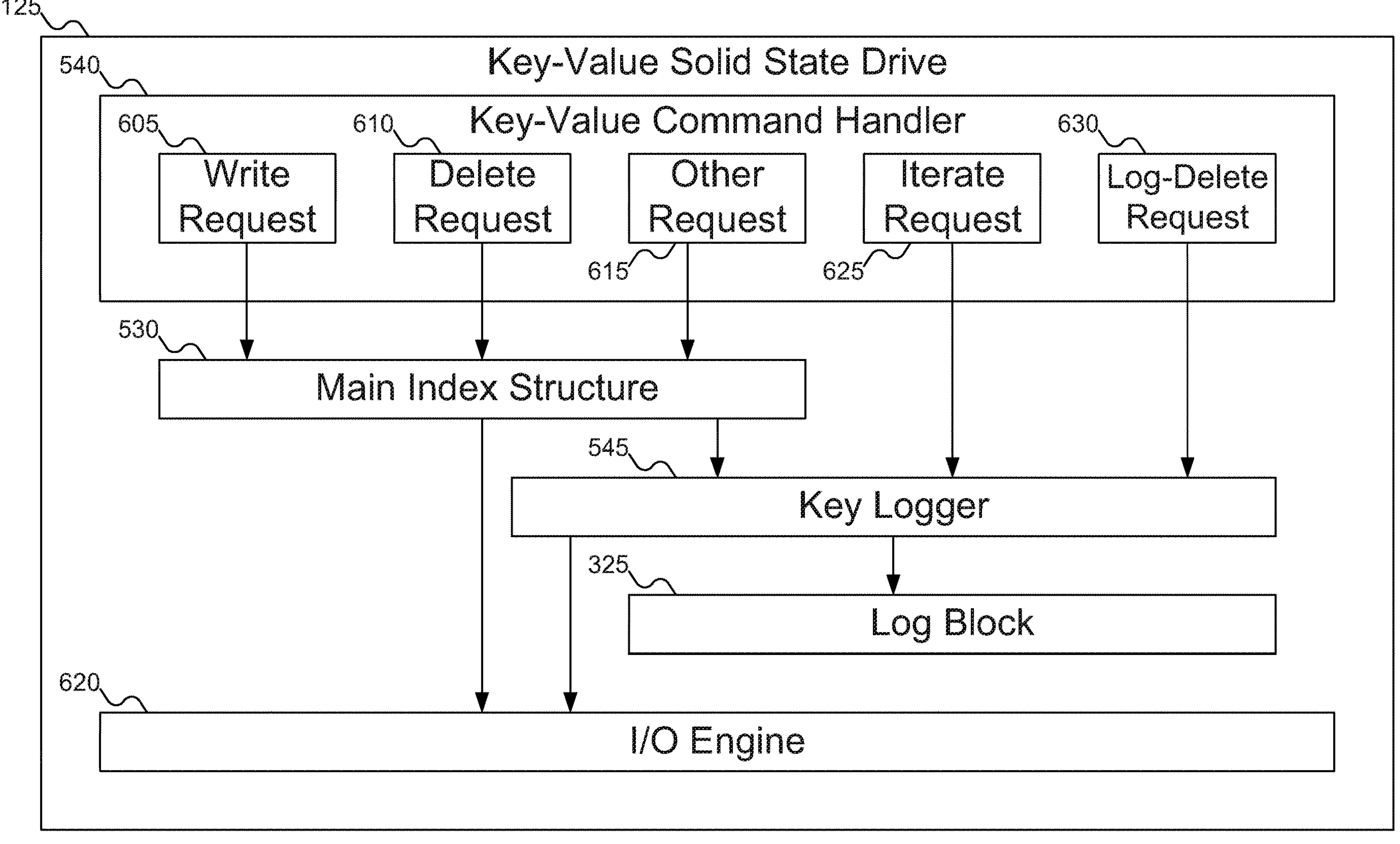
FIG. 6 shows interactions between the Key-Value command handler of FIG. 5, the main Key-Value index structure of FIG. 5, and the key logger of FIG. 5, according to embodiments of the inventive concept.

FIG. 6 shows interactions between Key-Value command handler 540 of FIG. 5, the main Key-Value index structure of FIG. 5, and key logger 545 of FIG. 5, according to embodiments of the inventive concept. In FIG. 6, Key-Value command 540 is shown as capable of receiving a number of different requests. This requests may include requests associated with accessing user data from the storage in storage device 125, such as write request 605, delete request 610, and other requests 615 (which may include, for example, a read request). Write request 605, delete request 610, and other requests 615 may include support for metadata used in key logging. Note that not all requests associated with user data necessarily affect key logging: for example, while writing new Key-Value pairs and deleting old Key-Value pairs may affect secondary index structure 535 of FIG. 5, updating the value paired with a key on storage device 125 or reading a value paired with a key from storage device 125 may not implicate key logging. But to the extent any request supported by Key-Value command handler 540 may implicate key logging, those requests may include metadata used in key logging.

When Key-Value command handler 540 receives a request that implicates key logging, Key-Value command handler 540 may pass the request (or at least the pertinent information, such as the operation, the key, and the options) to key logger 545. Key logger 545 may then write that information into log block 325. Key logger 545 may update log block 325 with the new information in any desired manner. Key logger 545 may also obtain additional information from other sources that may be included in log block 325: for example, the physical location where a value paired with a key is stored. By using an append operation (that is, writing the new information to the end of log block 325), log block 325 may also preserve the order in which requests were processed by key logger 545, which may be useful information. Key-Value command handler 540 (and storage device 125 generally) may also otherwise process the request as normal, updating main index structure 530 as appropriate and otherwise managing the data stored in flash chips 515-1 through 515-8 of FIG. 8 (via I/O engine 620).

In some situations, key logger 545 may need to do more than just write information to log block 325. For example, consider the situation where log block 325 is full (that is, there is no additional room for an update to be stored in log block 325). In that situation, key logger 545 may store log block 325 somewhere and start storing updates in a new log block. Key logger 545 may store log block 325 as a Key-Value pair in flash chips 515-1 through 515-8 of FIG. 5 (just the same as user data may be stored). Or, key logger 545 may store log block 325 in dedicated storage, such as in additional storage elements 550-1 and/or 550-2 of FIG. 5. Key logger 545 may also store log block 325 in multiple locations: for example in a memory (such as RAM or battery-backed RAM) local to key logger 545 as well as in persistent storage such as additional storage elements 550-1 and/or 550-2 of FIG. 5.

To update main index structure 530, Key-Value command handler 540 may simply append any pertinent information to main index structure 540. Recall that secondary index structure 535 of FIG. 5 may store the information from main index structure 540 in a sorted manner to assist in range queries: consequently, main index structure 540 may store information in an unsorted manner. In that case, a simple append may suffice to update main index structure 540.

Key-Value command handler 540 may also include support for additional requests that relate to managing information in log block 325. These requests may include iterate request 625 and log-delete request 630. Iterate request 625 may be used to access keys and other information from log block 325 that have yet to be incorporated into secondary index structure 535 of FIG. 5. When Key-Value command handler 540 receives iterate request 625, Key-Value command handler 540 may pass iterate request 625 to key logger 545. Key logger 545 may then read information about requests from log block 325, such as operations 330-1, 330-2, and 330-3 of FIG. 3, keys 335-1, 335-2, and 335-3 of FIG. 3, and options 340-1, 340-2, and 340-3 of FIG. 3 and return that information to host 105 of FIG. 1.

In embodiments of the inventive concept where key group (or other metadata) may be used, iterate request 625 may include the key group (or an identifier of other metadata) of interest. In this manner, Key-Value storage device 125 may return the information of interest to host 105 of FIG. 1.

Iterate request 625 may also include other parameters. For example, host 105 of FIG. 1 might specify as a parameter a number that may represent the maximum number of updates for Key-Value storage device 125 to return to host 105 of FIG. 1. For example, host 105 of FIG. 1 might request, for example, 20 updates be returned in response to iterate request 625. If log block 325 includes more than two entries, then information about the first 20 entries may be returned, and other entries may be left in log block 325 for later iteration. Host 105 of FIG. 1 thus might send multiple iterate requests 625 to retrieve information about all updates in log block 325.

There might also be limitations on how much information Key-Value storage device 125 may return in response to iterate request 625. For example, host 105 of FIG. 1 may have allocated a fixed amount of space—say, approximately 4 KB—for information about updates to Key-Value pairs in Key-Value storage device 125. This fixed amount of space may, for example, correspond to the size of log block 325. If log block 325 holds more data than may be returned in the specified amount of space, or if there are enough updates to fill more than one log block 325, key logger 545 might return only a subset of the updates logged by key logger 545. Key logger 545 might indicate somewhere in the information returned to host 105 of FIG. 1 whether there are additional updates that may be requested. For example, the first bit or byte of information returned might indicate whether there are more updates waiting, with 0 indicating no additional updates waiting and 1 indicating additional updates waiting. Key logger 545 may also indicate the presence of additional updates waiting for retrieval using other techniques: for example, host 105 of FIG. 1 might simply send iterate requests 625 until key logger 545 responds saying no further updates are waiting. Thus, in some embodiments of the inventive concept, host 105 of FIG. 1 may issue multiple iterate requests 625 to retrieve all the updates.

There are a number of different ways in which key logger 545 may respond to iterate request 625. For example, key logger 545 might simply read information about updates from log block 325 and send that information back to host 105. If log block 325 is stored in any storage, such as additional storage elements 550-1 and/or 550-2 of FIG. 5 or in a memory (such as RAM) local to key logger 545, host 105 of FIG. 1 may not be able to access information from log block 325 directly and may need key logger 545 to provide the updates from log block 325 in response to iterate request 625. (If log block 325 is stored in persistent storage such as additional storage elements 550-1 and/or 550-2 of FIG. 5, key logger 545 might load log block 325 into a memory local to key logger 545 to expedite access to the information in log block 325.) On the other hand, if log block 325 is written to flash chips 515-1 through 515-8 of FIG. 8 just like any other Key-Value pair, key logger 545 may just return the key associated with log block 325 to host 105 of FIG. 1. Host 105 may then issue a read request to read the information in log block 325.

Upon receiving log-delete request 630, key logger 545 may then delete information from log block 325. The information being deleted responsive to log-delete request 630 may be the information about requests previously iterated to host 105 of FIG. 1 as a result of iterate request 625.

There are numerous ways in which key logger 545 may process log-delete request 630. For example, key logger 545 may store information about the last update sent to host 105 of FIG. 1. Then, upon receiving log-delete request 630, key logger 545 may delete all information in log block 325 up to the tracked key, or may outright delete log block 325. (Recall that one of the advantages of embodiments of the inventive concept is that other I/O operations may continue without interruption because of a merge-sort operation. Key logger 545 may add new information to log block 325 even during or after iterate request 625 is processed. Thus, key logger 545 might not assume that all information in log block 325 has been sent to host 105 responsive to iterate request 625.)

It might also happen that host 105 of FIG. 1 might request some, but not all, information from log block 325. For example, host 105 of FIG. 1 might include with iterate request 625 a number of updates to return. If this number is fewer than the number of updates stored in log block 325, then key logger 545 may know that not all information has been read from log block 325 and sent to host 105. This example demonstrates another case in which log block 325 may still store updates even after iterate request 630.

In another embodiment of the inventive concept, host 105 of FIG. 1 may include as a parameter to log-delete request 630 an identifier of the last information received by host 105 of FIG. 1, or a number of updates to delete. Key logger 545 may then delete information from log block 325 up to the specified update.

Note that key logger 545 may need more than just a key to know what information to delete from log block 325 and what information to keep in log block 325. For example, consider the situation where log block 325 stores information about three requests: a first request writing a value for a key labeled $k_1$, a second request writing a value for a key labeled $k_2$, and a third request deleting the value for the key labeled $k_1$, and assume that host 105 of FIG. 1 sends log-delete request 630 but only indicates the key labeled $k_1$ as the last key to delete. If key logger 545 only deletes information from log block 325 up to the first request involving the key labeled $k_1$, then the second and third requests would remain in log block 325. If host 105 of FIG. 1 has already received the information about these two requests, then leaving them in log block 325 would result in host 105 of FIG. 1 receiving the same information multiple times in different iterate requests 625. On the other hand, if host 105 of FIG. 1 has only received the information about the first request, then deleting the information about the second and third requests would mean host 105 of FIG. 1 would not receive information about those requests. In either situation, secondary index structure 535 of FIG. 5 may end up inconsistent with main index structure 530. Thus, key logger 545 may need more information from host 105 of FIG. 1 than just the key, and log-delete request 630 may include information about, for example, operation 330-1, 330-2, or 330-3 of FIG. 3 or option 340-1, 340-2, or 340-3 of FIG. 3, that may identify the last update iterated to host 105 of FIG. 1, or an identifier of the entry in log block 325 (such as an entry number, with entries in log block 325 enumerated starting with the first entry in log block 325).

As discussed above, in some embodiments of the inventive concept, key logger 545 may store log block 325 in dedicated storage that is inaccessible to host 105 of FIG. 1 via Key-Value requests. In such embodiments of the inventive concept, log-delete request 630 may be used to delete information in log block 325. But in embodiments of the inventive concept where log block 325 may be stored as a Key-Value pair in flash chips 515-1 through 515-8 of FIG. 5 (like user data), host 105 of FIG. 1 may delete log block 325 by issuing delete request 610. In such embodiments of the inventive concept, log-delete request 630 may be omitted in favor of delete request 610.

Figure 7:
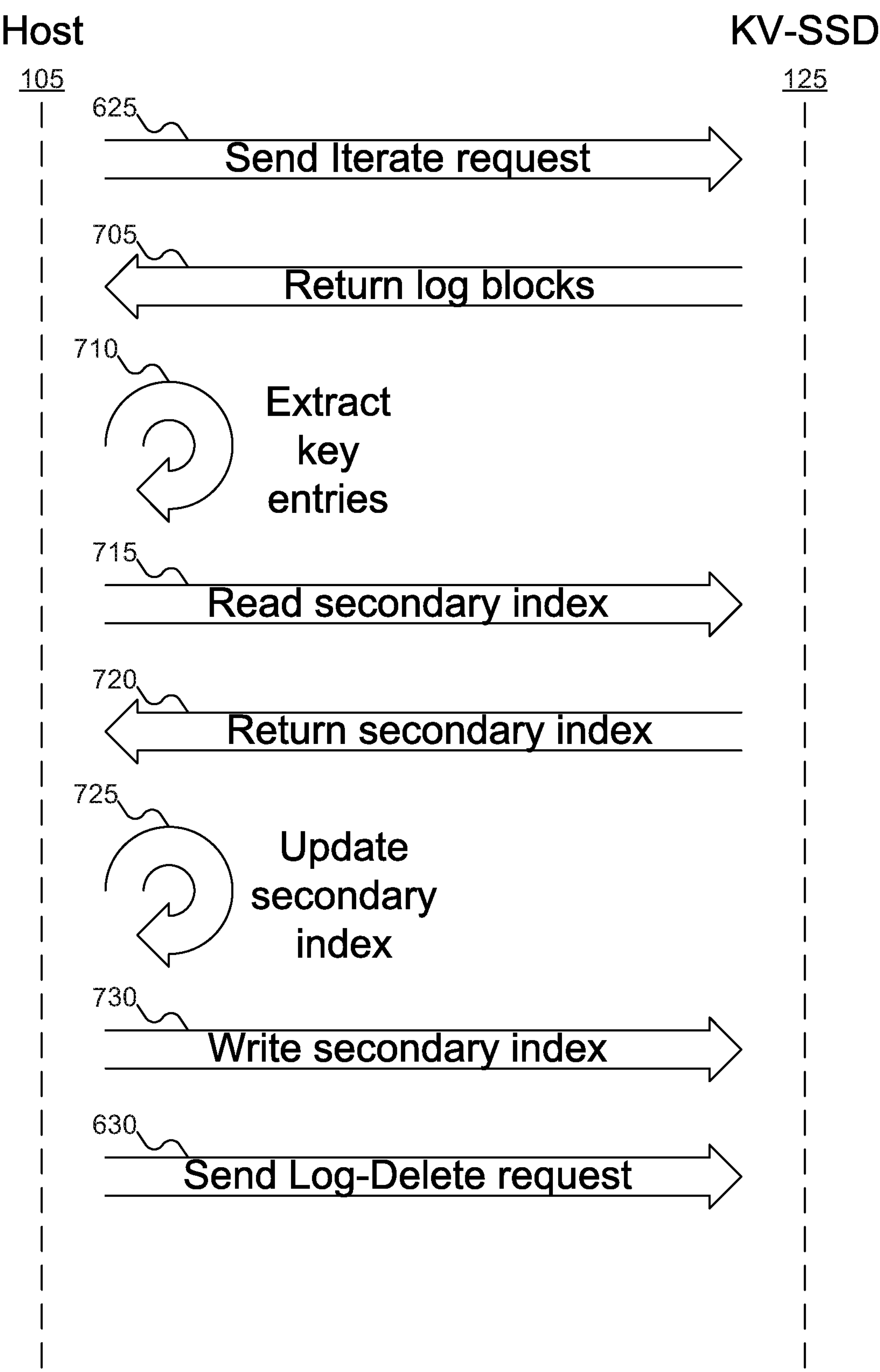
FIG. 7 shows an alternative view of operations involved in performing merging keys, according to embodiments of the inventive concept.

FIG. 7 shows an alternative view of operations involved in performing merging keys, according to embodiments of the inventive concept. In FIG. 7, host 105 may send iterate request 625 to Key-Value storage device 125. In response 705, Key-Value storage device 125 may return information from log block 325 of FIG. 3. As discussed above, iterate request 625 and response 705 may be performed multiple times, as appropriate. Host 105 may then extract the keys from the information returned in response 705, as shown in operation 710.

Host 105 may then send read request 715 to read secondary index structure 535 of FIG. 5, with Key-Value storage device 125 returning secondary index structure 535 of FIG. 5 in response 720. Operations 715 and 720 may be performed in situations where host 105 does not already store secondary index structure 535: for example, if a power interruption has caused the loss of secondary index structure 535 of FIG. 5 from memory 115 of FIG. 1 of host 105 of FIG. 1. (As discussed above, storing secondary index structure 535 of FIG. 5 on Key-Value storage device 125 may avoid the need to recreate secondary index structure 535 of FIG. 5 from scratch in such situations.) If host 105 already has a copy of secondary index structure 535 of FIG. 5, then operations 715 and 720 may be omitted.

Host 105 may then perform update operation 725 on secondary index structure 535 of FIG. 5. This update operation 725 may involve performing a merge-sort operation to add keys to secondary index structure 535 of FIG. 5 as presented in the updates from log block 325 of FIG. 3 (and to delete keys from secondary index structure 535 of FIG. 5 as presented in the updates from log block 325 of FIG. 3), and producing a sorted structure.

Finally, host 105 may send write request 730 to write secondary index structure 535 of FIG. 5 to Key-Value storage device 125 (again, to avoid host 105 needing to recreate secondary index structure 535 of FIG. 5 from scratch). Write request 730 is optional, since Key-Value storage device 125 may not need to store secondary index structure 535 of FIG. 5. Finally, host 105 may send log-delete request 720 to Key-Value storage device 125, to delete updates from log block 325 of FIG. 3.

Figure 8:
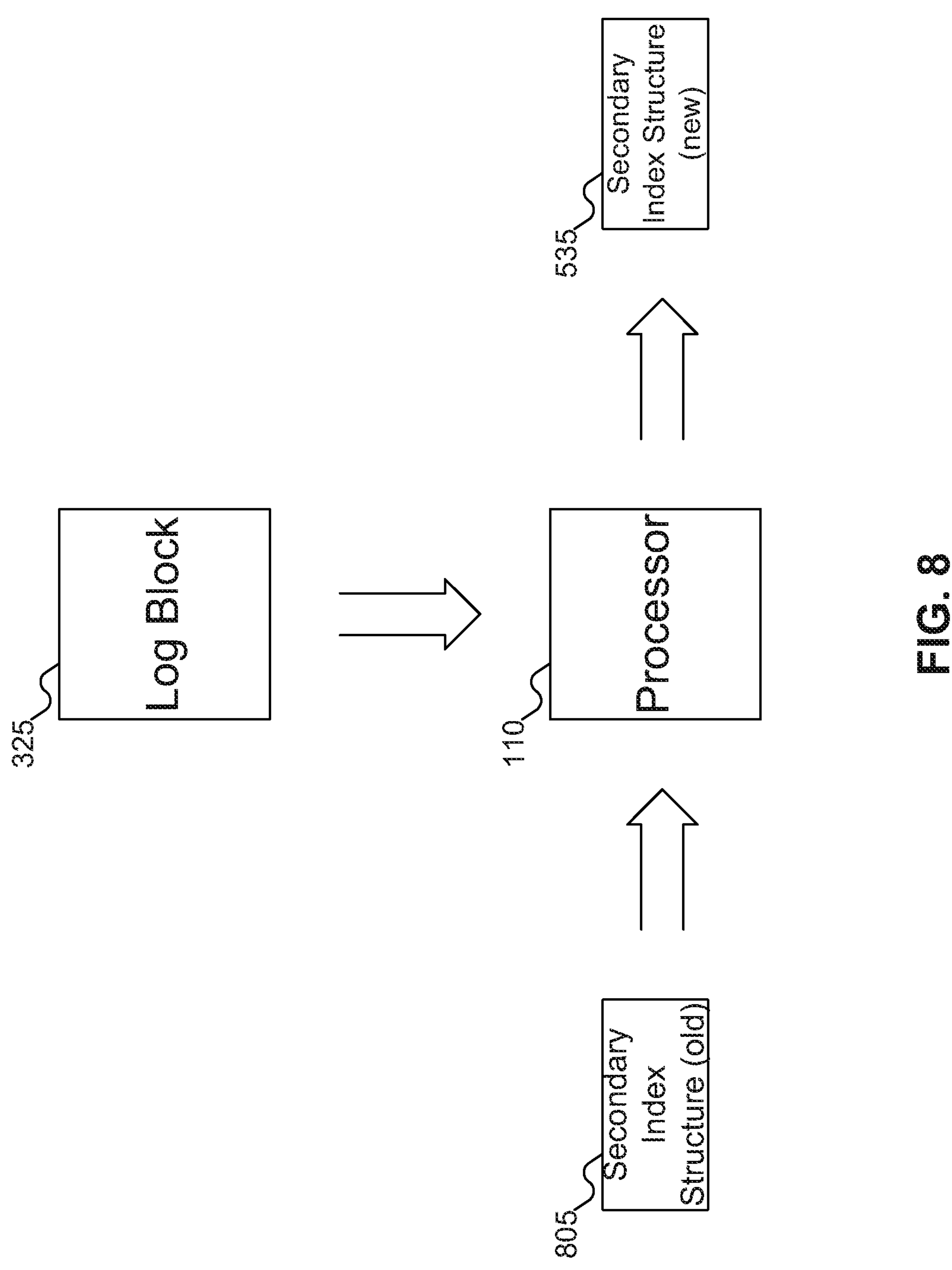
FIG. 8 shows the processor of FIG. 1 merging keys into the secondary index structure of FIG. 5, according to embodiments of the inventive concept.

FIG. 8 shows processor 110 of FIG. 1 merging keys into secondary index structure 535 of FIG. 5, according to embodiments of the inventive concept. In FIG. 8, processor 110 may receive log block 325 (or perhaps more accurately, updates from log block 325). Processor 110 may then use these updates to merge-sort keys into second secondary index structure 805 to produce new secondary index structure 535.

In some embodiments of the inventive concept, collaborative key sorting may be performed by Key-Value storage device 125 of FIG. 1 performing key logging, while host 105 of FIG. 1 may perform the update of secondary index structure 535. This combination leverages the power of Key-Value storage device 125 of FIG. 1 to track what changes need to be made to secondary index structure 535 of FIG. 5 with the processing capability of host 105 of FIG. 1 to make the updates to secondary index structure 535 in a manner that avoids Key-Value storage device 125 temporarily blocking I/O while updating main index structure 530 of FIG. 5. But since processor 110 may be any type of processor, should Key-Value storage device 125 of FIG. 1 include a processor, that processor may be used to generate secondary index structure 535 internally to Key-Value storage device 125 of FIG. 1, without involving host 105 of FIG. 1 Thus, if Key-Value storage device 125 of FIG. 1 includes a processor—be it a CPU, GPU, GPGPU, suitably configured FPGA, suitably designed ASIC, or any other type of processor—this processor may be responsible for generating secondary index structure 535, rather than host 105 of FIG. 1. In other words, embodiments of the inventive concept may include any functionality described above and/or below as being performed by host 105 of FIG. 1 as being performed by the processor of Key-Value storage device 125 of FIG. 1 instead. (To avoid other processes of Key-Value storage device 125 of FIG. 1 being delayed, in some embodiments of the inventive concept this processor that may generate and/or update secondary index structure 535 may be separate from any other processor, such as that used by SSD controller 510 of FIG. 5, that might be part of Key-Value storage device 125 of FIG. 1.)

Figure 9:
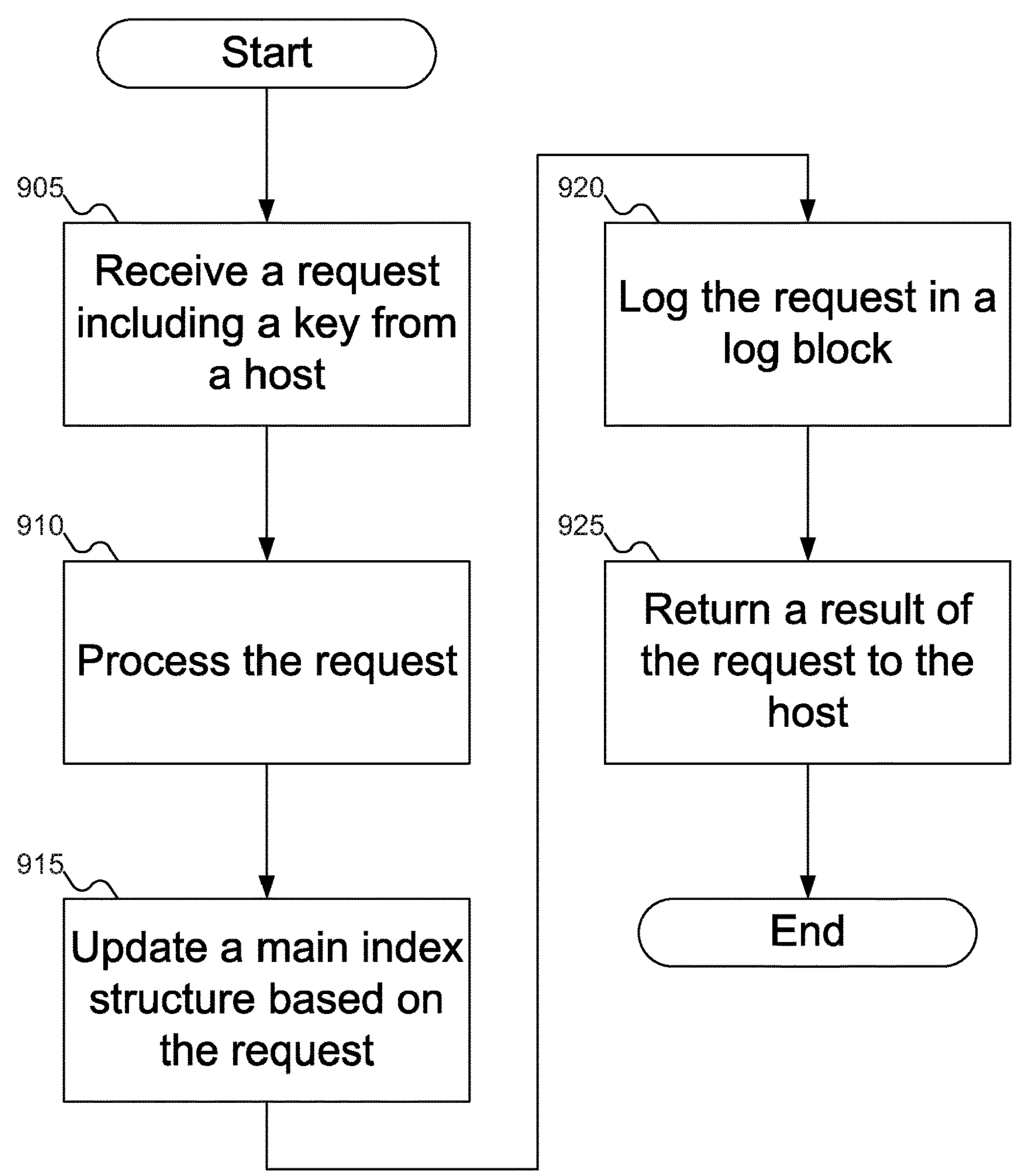
FIG. 9 shows a flowchart of an example procedure for the storage device of FIG. 1 to perform key logging, according to embodiments of the inventive concept.

FIG. 9 shows a flowchart of an example procedure for storage device 125 of FIG. 1 to perform key logging, according to embodiments of the inventive concept. In FIG. 9, at block 905, Key-Value command handler 540 of FIG. 5 may receive a request, such as write request 605 of FIG. 6 or delete request 610 of FIG. 6, from host 105 of FIG. 1. At block 910, Key-Value command handler 540 of FIG. 5 may process the request. At block 915, Key-Value command handler 540 of FIG. 5 may update main index structure 530 of FIG. 5 to reflect any changes brought about by the request.

At block 920, key logger 545 of FIG. 5 may log the key and other information in log block 325 of FIG. 3. As discussed above with reference to FIG. 3, this other information may include opcode 330-1, 330-2, and 330-3 of FIG. 3 and/or options 340-1, 340-2, and 340-3 of FIG. 3. In addition, key logger 545 of FIG. 5 may use information in the request, such as key group metadata, in logging the key and other information. Finally, at block 925, Key-Value storage device 125 of FIG. 1 may return a result of the request to host 105 of FIG. 1.

Figure 10:
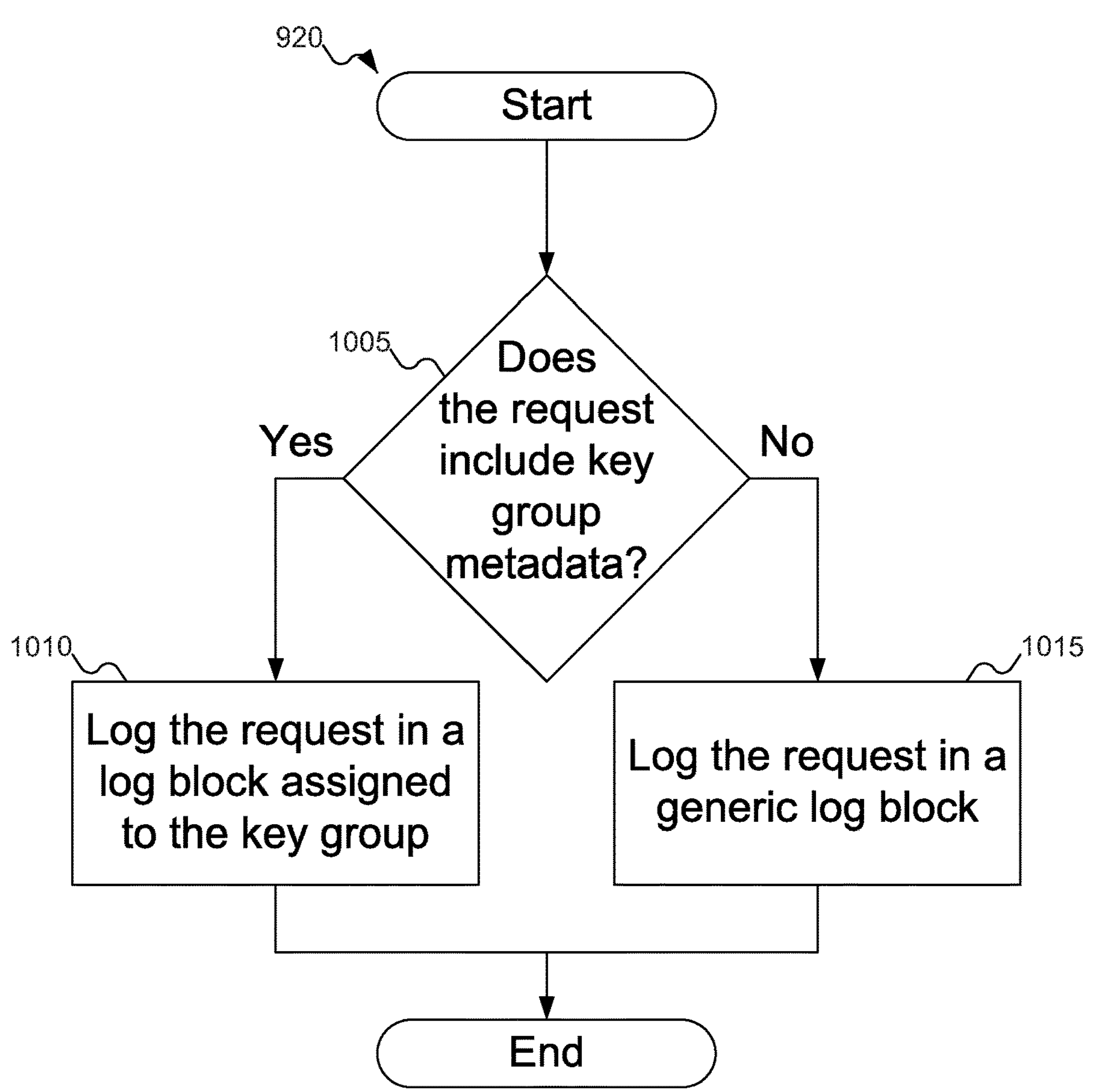
FIG. 10 shows a flowchart of an example procedure for the key logger of FIG. 5 to log keys using key group metadata, according to an embodiment of the inventive concept.

FIG. 10 shows a flowchart of an example procedure for key logger 545 of FIG. 5 to log keys using key group metadata, according to an embodiment of the inventive concept. In FIG. 10, at block 1005, key logger 545 of FIG. 5 may determine whether the request includes any key group metadata. If so, then at block 1010, key logger 545 of FIG. 5 may log the information about the request in log block 325 of FIG. 3 that is associated with that key group. Otherwise, at block 1010, key logger 545 of FIG. 5 may log the information about the request in log block 325 of FIG. 3 that is generic (that is, not associated with a particular key group).

Figure 11A:
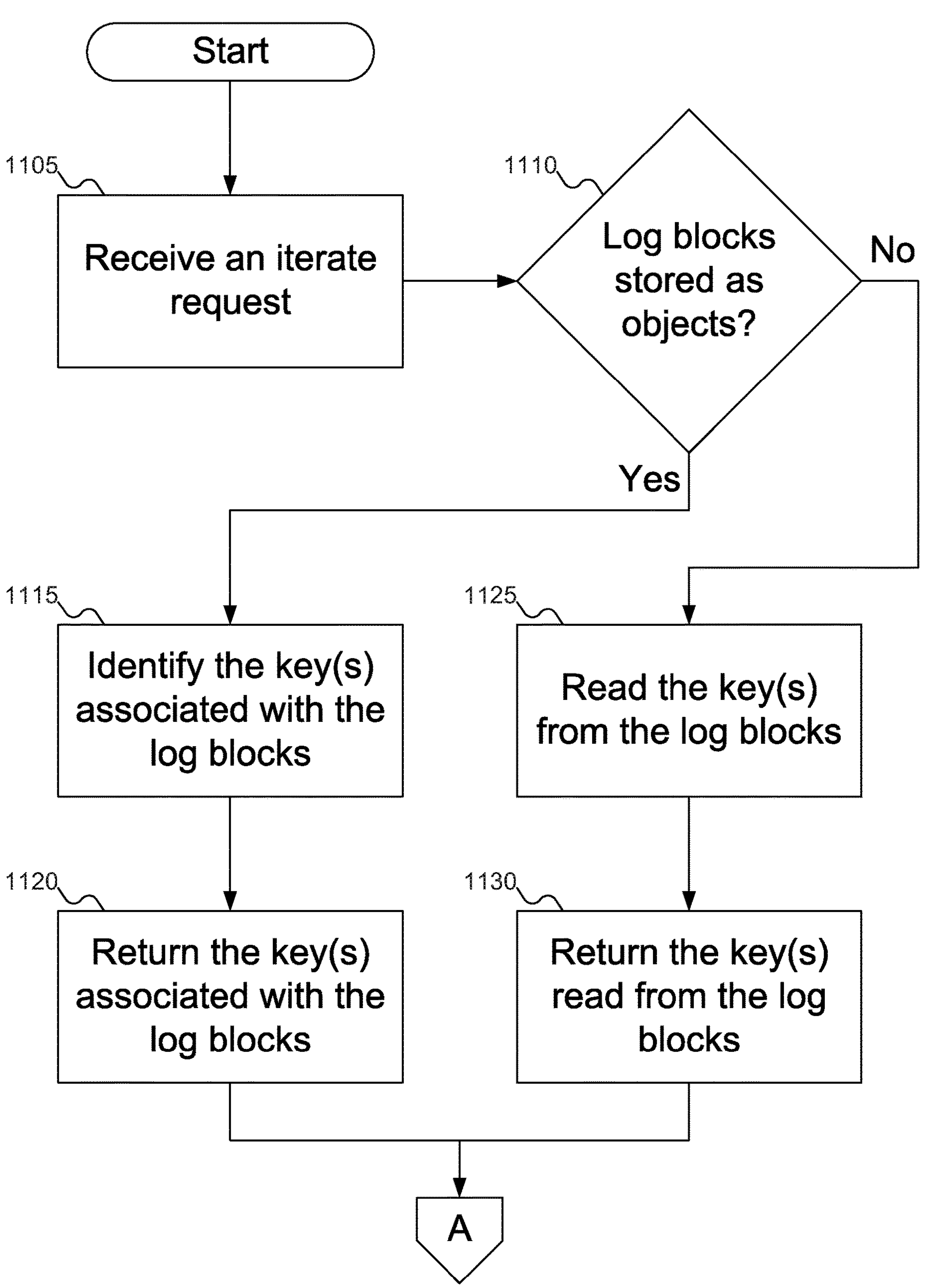
FIGS. 11A-11B show a flowchart of an example procedure for the storage device of FIG. 1 to assist the processor of FIG. 1 in merging keys into the secondary index structure of FIG. 5, according to embodiments of the inventive concept.
Figure 11B:
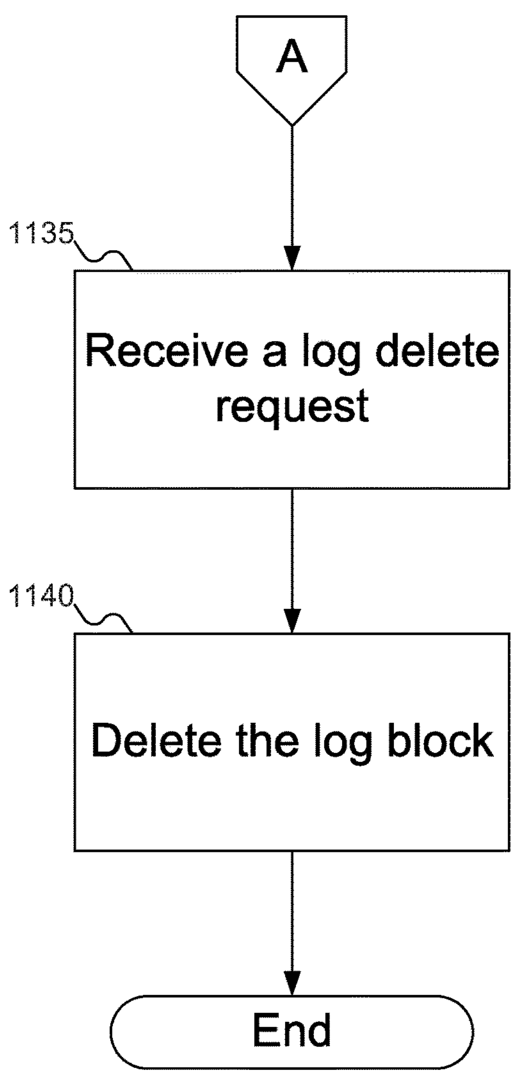

FIGS. 11A-11B show a flowchart of an example procedure for storage device 125 of FIG. 1 to assist processor 110 of FIG. 1 in merging keys into secondary index structure 535 of FIG. 5, according to embodiments of the inventive concept. In FIG. 11A, at block 1105, Key-Value command handler 540 of FIG. 5 may receive iterate request 625 of FIG. 6 from host 105 of FIG. 1. At block 1110, key logger 545 of FIG. 4 may determine if log block 325 of FIG. 3 is stored as an object (that is, a Key-Value pair) in the main storage of Key-Value storage device 125 of FIG. 1. If so, then at block 1115 key logger 545 of FIG. 4 may determine the key associated with log block 325 of FIG. 3 as a Key-Value pair, and at block 1120 key logger 545 of FIG. 5 may return that key to host 105 of FIG. 1. If there are multiple log blocks 325 of FIG. 3 stored as objects in the main storage of Key-Value storage device 125 of FIG. 1, blocks 1115 and 1120 may be to separately identify the key for each such log block object. Alternatively, key logger 545 of FIG. 5 may return the key for only one log block 325 of FIG. 3 stored as an object in the main storage of Key-Value storage device 125 of FIG. 1, and let host 105 of FIG. 1 repeat iterate request 625 (block 1105) for each such log block separately.

On the other hand, if log block 325 of FIG. 3 is not stored as an object in the main storage of Key-Value storage device 125 of FIG. 1 (in other words, log block 325 is stored somewhere other than in the main storage of Key-Value storage device 125 of FIG. 1, such as additional storage elements 550-1 and/or 550-2 of FIG. 5, and therefore may not be directly accessible by host 105 of FIG. 1), then at block 1125 key logger 545 of FIG. 5 may access information about operations stored in log block 325 of FIG. 3, and at block 1130 key logger 545 of FIG. 5 may return such information to host 105 of FIG. 1. If there is more than one log block 325 of FIG. 3, blocks 1125 and 1130 may be repeated for each log block 325 of FIG. 3, or host 105 of FIG. 1 may issue iterate request 625 of FIG. 6 multiple times to receive all the information about requests that updated key in Key-Value storage device 125 of FIG. 1.

In yet other embodiments of the inventive concept, even though log block 325 of FIG. 3 may be stored as an object in the main storage of Key-Value storage device 125 of FIG. 1, key logger 545 of FIG. 5 may proceed with performing blocks 1125 and 1130. Thus, even if log block 325 of FIG. 3 is stored as an object in Key-Value storage device 125 of FIG. 1, key logger 545 of FIG. 5 may still iterate the information from log block 325 of FIG. 3, rather than just providing the key associated with log block 325 of FIG. 3 and letting host 105 of FIG. 1 read the objects storing log block 325 of FIG. 3.

Regardless of whether key logger 545 of FIG. 5 returns information about updates from log block 325 of FIG. 3 directly to host 105 of FIG. 1 or key logger 545 of FIG. 5 provides host 105 of FIG. 1 with a key identifying an object in the main storage of Key-Value storage device 125 of FIG. 1 where log block 325 of FIG. 3 is stored, at block 1135 (FIG. 11B) Key-Value command handler 540 of FIG. 5 may receive log-delete request 630. (Note that in the case where log block 325 of FIG. 3 is stored as an object in the main storage of Key-Value storage device 125 of FIG. 1, log-delete request 630 may be delete request 610 of FIG. 6, since log block 325 of FIG. 3 may be deleted like any other object stored in the main storage of Key-Value storage device 125 of FIG. 1). Then, at block 1140, Key-Value storage device 125 of FIG. 1 may delete log block 325 of FIG. 3 (either be deleting the object storing log block 325 of FIG. 3 in the main storage of Key-Value storage device 125 of FIG. 1, or by key logger 545 of FIG. 5 deleting updates from log block 325 of FIG. 3, as appropriate to how log block 325 of FIG. 3 is stored).

Figure 12:
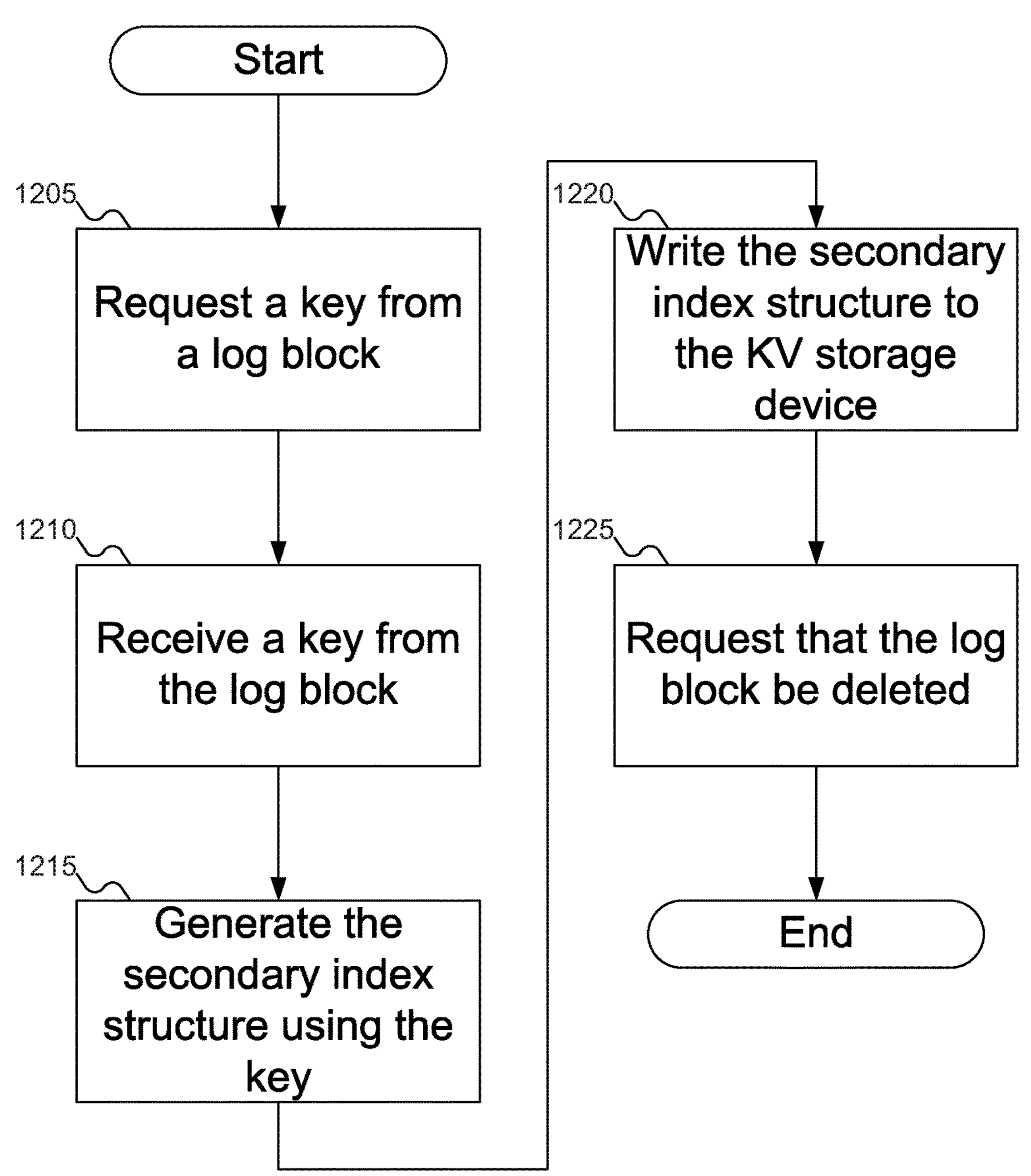
FIG. 12 shows a flowchart of an example procedure for the processor of FIG. 1 to merge keys into the secondary index structure of FIG. 5, according to embodiments of the inventive concept.

FIG. 12 shows a flowchart of an example procedure for processor 110 of FIG. 1 to merge keys into secondary index structure 535 of FIG. 5, according to embodiments of the inventive concept. In FIG. 12, at block 1205, host 105 of FIG. 1 may request from Key-Value storage device 125 of FIG. 1 a key (and other information) from log block 325 of FIG. 3, and at block 1210 host 105 of FIG. 1 may receive that key (and other information) from Key-Value storage device 125 of FIG. 1. (Host 105 of FIG. 1 may perform this request using iterate command 625 of FIG. 6.)

At block 1215, host 105 of FIG. 5 may generate secondary index structure 535 of FIG. 5 using the key (and other information) received from Key-Value storage device 125 of FIG. 1. At block 1220, host 105 of FIG. 1 may send write request 605 of FIG. 6 to write secondary index structure 535 of FIG. 5 to Key-Value storage device 125 of FIG. 1. Finally, at block 1225, host 105 of FIG. 1 may send log-delete request 630 of FIG. 6 to Key-Value storage device 125 of FIG. 1 to delete log block 325 of FIG. 3.

Figure 14:
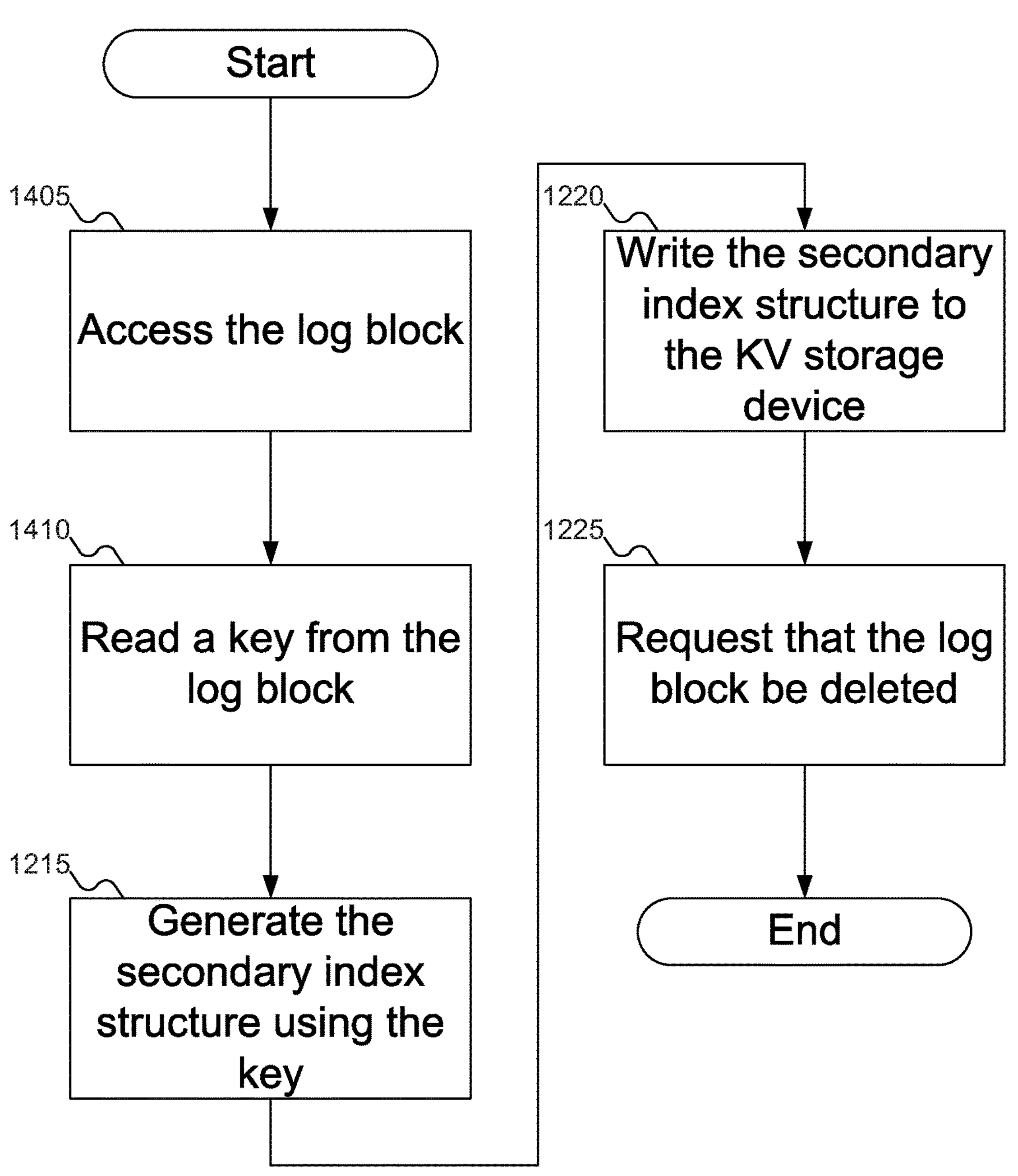
FIG. 14 shows a flowchart of an example procedure for the Key-Value storage device of FIG. 1 to merge keys into the secondary index structure of FIG. 5, according to embodiments of the inventive concept.

As discussed above, in some embodiments of the inventive concept, Key-Value storage device 125 of FIG. 1 may perform the update of secondary index structure 535 of FIG. 5, particularly when Key-Value storage device 125 of FIG. 1 may include processor 110 (and memory 115) of FIG. 1 (or its own processor 110 and/or memory 115 of FIG. 1) to perform the update without interfering with other operations (particularly I/O operations) of Key-Value storage device 125 of FIG. 1. While processor 110 of FIG. 1, when part of Key-Value storage device 125 of FIG. 1, may use the example procedure outlined in FIG. 12, processor 110 of FIG. 1 may also be able to leverage its presence within Key-Value storage device 125 of FIG. 1 in certain ways. FIG. 14 shows a flowchart of an example procedure for the Key-Value storage device of FIG. 1 to merge keys into the secondary index structure of FIG. 5, according to embodiments of the inventive concept.

Figure 13:
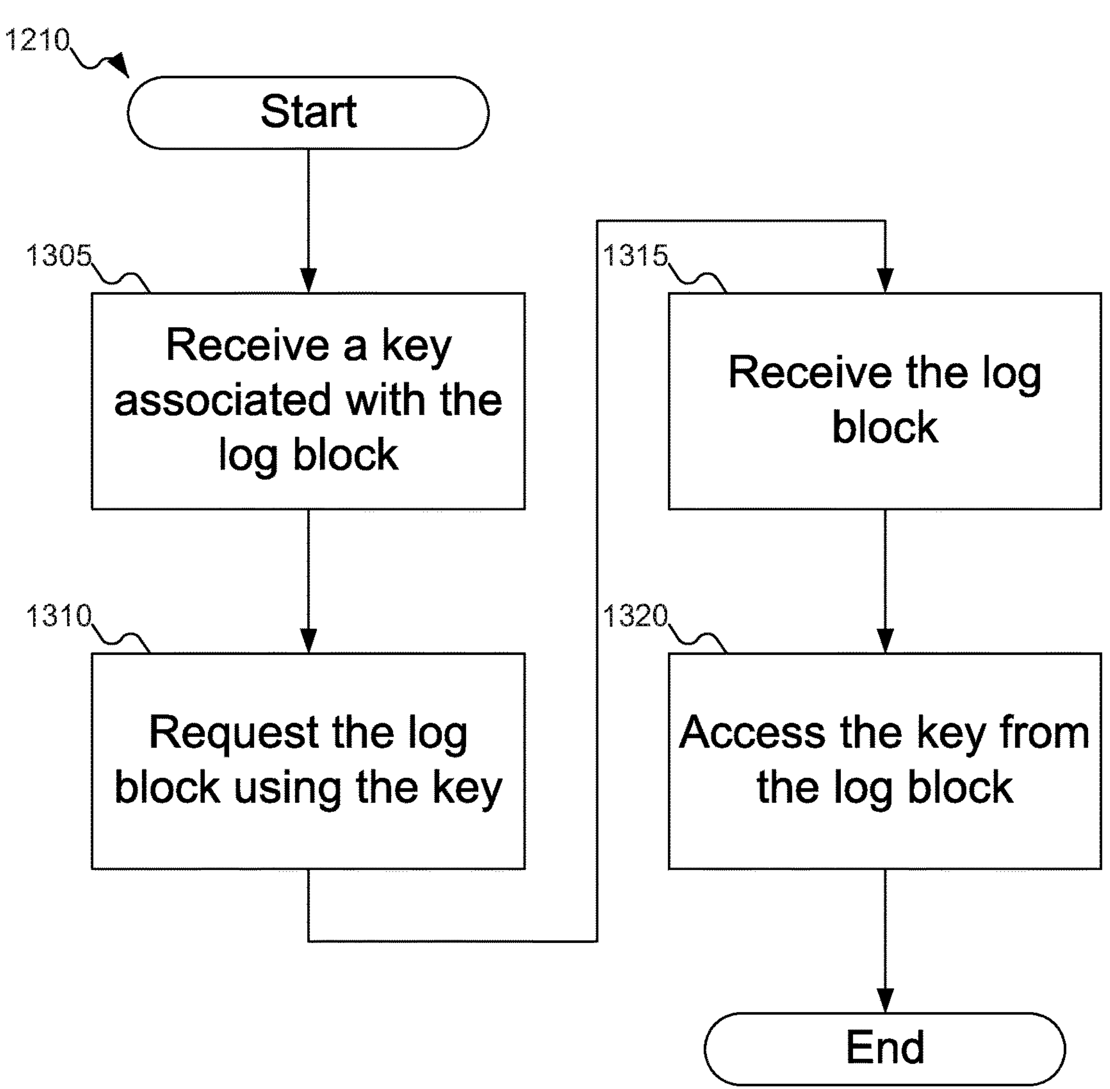
FIG. 13 shows a flowchart of an example procedure for the processor of FIG. 1 to access keys from the log block of FIG. 3, according to an embodiment of the inventive concept.

FIG. 13 shows a flowchart of an example procedure for processor 110 of FIG. 1 to access keys from log block 325 of FIG. 3, according to an embodiment of the inventive concept. In particular, FIG. 13 shows a flowchart of an example procedure for processor 110 of FIG. 1 to access keys from log block 325 of FIG. 3 when log block 325 of FIG. 3 is stored in the main storage of Key-Value storage device 125 of FIG. 1. In FIG. 13, at block 1305, host 105 of FIG. 1 may receive from Key-Value storage device 125 of FIG. 1 a key identifying an object stored in the main storage of Key-Value storage device 125 of FIG. 1. At block 1310, host 105 of FIG. 1 may send a read request to Key-Value storage device 125 using that received key. At block 1315, in response to the read request, host 105 of FIG. 1 may receive log block 325 of FIG. 3 from Key-Value storage device 125. Finally, at block 1320, host 105 of FIG. 1 may access the key (and other information) from log block 325 of FIG. 3 as received from Key-Value storage device 125 of FIG. 1.

Figure 15:
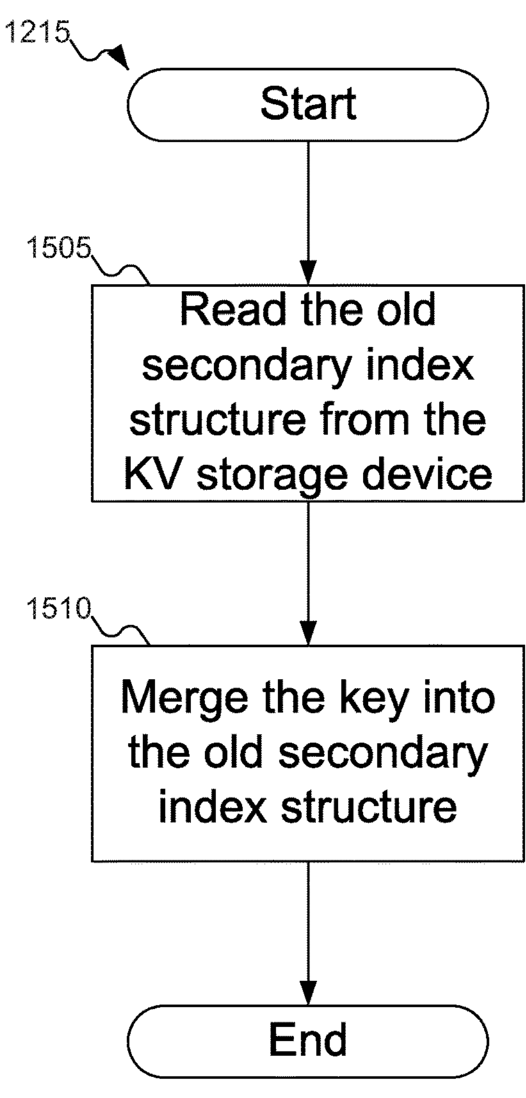
FIG. 15 shows a flowchart of an example procedure for the processor of FIG. 1 to merge keys with the second secondary index structure of FIG. 8, according to an embodiment of the inventive concept.
Figure 16:
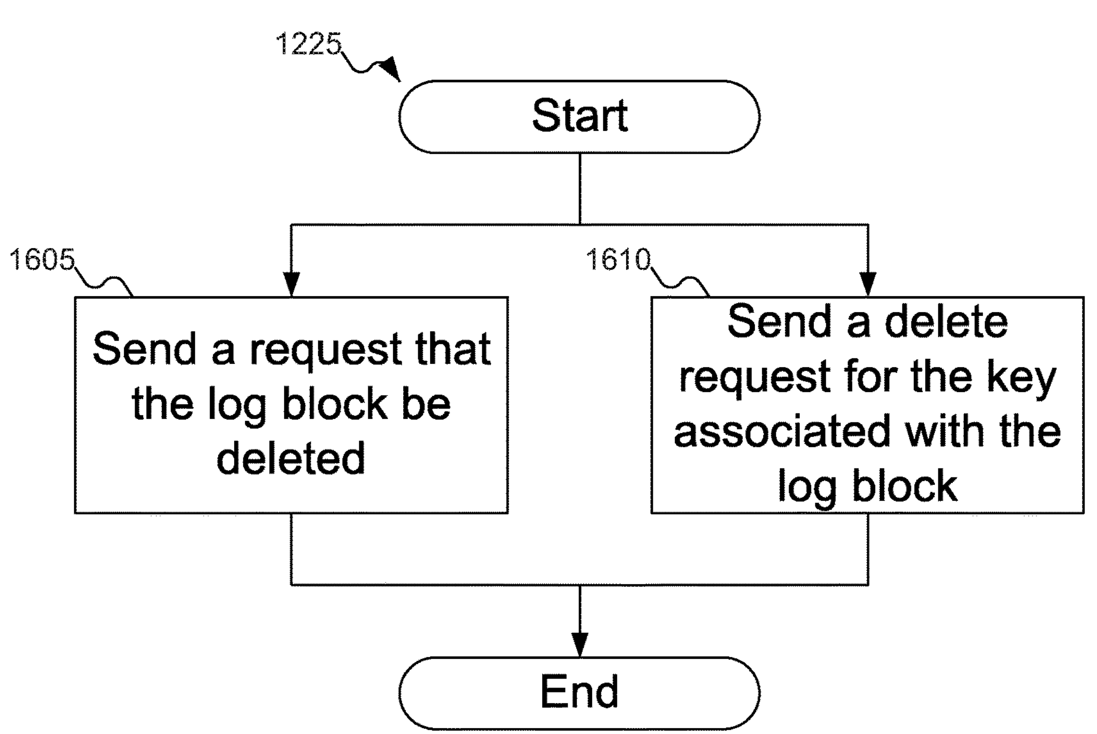
FIG. 16 shows a flowchart of an example procedure for the processor of FIG. 1 to request that the log block of FIG. 3 be deleted, according to an embodiment of the inventive concept.

FIG. 14 is similar to claim FIG. 12. But instead of requesting keys from Key-Value storage device 125 of FIG. 1, processor 110 of FIG. 1, when included in Key-Value storage device 125 of FIG. 1, may be able to access log block 325 of FIG. 3 directly, whether stored in the main storage of Key-Value storage device 125 of FIG. 1 or in additional storage elements 550-1 and/or 550-2 of FIG. 5 (which might not be accessible to host 105 of FIG. 1). Thus, at block 1405 in FIG. 14, processor 110 of FIG. 1 may access log block 325 of FIG. 3, and at block 1410 processor 110 of FIG. 1 may read keys (and other information) from log block 325 of FIG. 3. The rest of FIG. 14 (blocks 1215, 1220, and 1225) may be performed by processor 110 of FIG. 1 within Key-Value storage device 125 of FIG. 1 the same as performed by host 105 of FIG. 12 as shown in the flowchart of the example procedure of FIG. 12. FIGS. 15-16 below may also be performed by processor 110 of FIG. 1 when include in Key-Value storage device 125 of FIG. 1, whether or not expressly described.

FIG. 15 shows a flowchart of an example procedure for processor 110 of FIG. 1 to merge keys with second secondary index structure 805 of FIG. 8, according to an embodiment of the inventive concept. In FIG. 15, at block 1505, processor 110 of FIG. 1 may read second secondary index structure 805 of FIG. 8 from Key-Value storage device 125 of FIG. 1. At block 1510, processor 110 of FIG. 1 may perform a merge-sort operation to merge the key (and other information) read from log block 325 of FIG. 3 into second secondary index structure 805 of FIG. 8 to produce secondary index structure 535 of FIG. 5.

FIG. 16 shows a flowchart of an example procedure for processor 110 of FIG. 1 to request that log block 325 of FIG. 3 be deleted, according to an embodiment of the inventive concept. In FIG. 16, at block 1605, processor 110 of FIG. 1 may send log-delete request 630 of FIG. 6, requesting that key logger 545 of FIG. 5 delete log block 325 of FIG. 3. Alternatively (for example, if log block 325 of FIG. 3 is stored in the main storage of Key-Value storage device 125 of FIG. 1), processor 110 of FIG. 1 may send delete request 610 of FIG. 6 to delete log block 325 of FIG. 3.

Not shown in FIG. 16 is that processor 110 of FIG. 1, when included in Key-Value storage device 125 of FIG. 1, may be able to directly delete log block 325 of FIG. 3 using other means that are not available to host 105 of FIG. 1 (that is, using functionality available only internally to Key-Value storage device 125 of FIG. 1, such as being able to delete data directly from additional storage elements 550-1 and/or 550-2). Embodiments of the inventive concept may include deleting log block 325 of FIG. 3 using any other means to delete log block 325 of FIG. 3.

In FIGS. 9-16, some embodiments of the inventive concept are shown. But a person skilled in the art will recognize that other embodiments of the inventive concept are also possible, by changing the order of the blocks, by omitting blocks, or by including links not shown in the drawings, irrespective of any elements that may specifically be omitted. All such variations of the flowcharts are considered to be embodiments of the inventive concept, whether expressly described or not.

Embodiments of the inventive concept include technical advantages over some implementations. By separating the processes of key logging and merging, a Key-Value storage device may support key logging while leaving the merging process to the host machine. Further, since the result of the merging process is a secondary index structure, the main index structure used to manage Key-Value pairs in the Key-Value storage device is not affected by the merging process. This fact means that the Key-Value storage device may continue to use the main index structure for input/output purposes, even while the secondary index structure is being updated. By avoiding the Key-Value storage device having to interrupt or otherwise delay input/output processing, the Key-Value storage device may offer improved performance. But the secondary index structure is still available to be used to satisfy range queries.

The following discussion is intended to provide a brief, general description of a suitable machine or machines in which certain aspects of the inventive concept can be implemented. The machine or machines can be controlled, at least in part, by input from input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Embodiments of the inventive concept can include a tangible, non-transitory machine-readable medium comprising instructions executable by one or more processors, the instructions comprising instructions to perform the elements of the inventive concepts as described herein.

Having described and illustrated the principles of the inventive concept with reference to illustrated embodiments, it will be recognized that the illustrated embodiments can be modified in arrangement and detail without departing from such principles, and can be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept can extend to the following statements, without limitation:

Statement 1. An embodiment of the inventive concept includes a Key-Value (KV) storage device, comprising:

a first storage for data, the first storage device including a persistent storage;

a second storage storing a main index structure mapping a key to a location in the first storage storing a value, the key and the value forming a Key-Value pair;

a controller to process at least one of a read request, a write request, or a delete request received from a host using the first storage; and a third storage storing a secondary index structure storing the key, wherein the secondary index structure is sorted.

Statement 2. An embodiment of the inventive concept includes the KV storage device according to statement 1, wherein the KV storage device includes a KV Solid State Drive (SSD).

Statement 3. An embodiment of the inventive concept include the KV storage device according to statement 1, wherein the third storage maps the key to the location in the first storage storing the value.

Statement 4. An embodiment of the inventive concept includes the KV storage device according to statement 1, wherein the KV storage device may use the secondary index structure to respond to a range query.

Statement 5. An embodiment of the inventive concept includes the KV storage device according to statement 1, wherein the secondary index structure includes at least one of a B+-tree, a B-tree, a slotted page, or a Skip List.

Statement 6. An embodiment of the inventive concept includes the KV storage device according to statement 1, wherein the first storage includes at least one of the second storage and the third storage.

Statement 7. An embodiment of the inventive concept includes the KV storage device according to statement 1, further comprising a fourth storage storing a log block, the log block including a second key, the second key and a second location in the first storage storing a second value associated with the second key stored in the main index structure.

Statement 8. An embodiment of the inventive concept includes the KV storage device #(125) according to statement 7, wherein the secondary index structure does not include the second key.

Statement 9. An embodiment of the inventive concept includes the KV storage device according to statement 7, wherein the fourth storage includes at least one of a non-volatile storage and a battery-backed volatile storage.

Statement 10. An embodiment of the inventive concept includes the KV storage device according to statement 7, wherein the fourth storage includes at least one of a block storage, a Key-Value storage, or a byte-addressable storage.

Statement 11. An embodiment of the inventive concept includes the KV storage device according to statement 7, wherein the first storage includes the fourth storage.

Statement 12. An embodiment of the inventive concept includes the KV storage device according to statement 7, wherein the log block further includes at least one of an identifier of an operation and metadata.

Statement 13. An embodiment of the inventive concept includes the KV storage device according to statement 7, wherein the log block is associated with one of at least two log blocks, each of the at least two log blocks associated with a key group identifier.

Statement 14. An embodiment of the inventive concept includes the KV storage device according to statement 13, wherein at least one of the write request or the delete request may include the key group identifier as metadata.

Statement 15. An embodiment of the inventive concept includes the KV storage device according to statement 7, further comprising a key logger to add the second key to the log block based at least in part on at least one of the write request or the delete request from the host, the at least one of the write request or the delete request including the second key.

Statement 16. An embodiment of the inventive concept includes the KV storage device according to statement 15, wherein the key logger sends the second key to the host based at least in part on receiving an iterate request from the host.

Statement 17. An embodiment of the inventive concept includes the KV storage device according to statement 15, wherein the key logger sends a third key associated with the log block.

Statement 18. An embodiment of the inventive concept includes the KV storage device according to statement 17, wherein the host may request the log block using the read request.

Statement 19. An embodiment of the inventive concept includes the KV storage device according to statement 15, wherein the key logger deletes the log block based at least in part on receiving a log-delete request from the host.

Statement 20. An embodiment of the inventive concept includes the KV storage device according to statement 15, further comprising a processor to generate the secondary index structure from the log blocks.

Statement 21. An embodiment of the inventive concept includes the KV storage device according to statement 20, wherein the processor includes at least one of a central processing unit (CPU), a graphics processing unit (GPU), a general purpose GPU (GPGPU), a Field Programmable Gate Array (FPGA), and an Application-Specific Integrated Circuit (ASIC).

Statement 22. An embodiment of the inventive concept includes the KV storage device according to statement 20, wherein the processor generates the secondary index structure from the log blocks and an second secondary index structure.

Statement 23. An embodiment of the inventive concept includes the KV storage device according to statement 22, wherein the processor executes a merge sort algorithm on the second key and data in the second secondary index structure.

Statement 24. An embodiment of the inventive concept includes the KV storage device according to statement 15, wherein the key logger adds the second location to the log block based at least in part on the write request from the host.

Statement 25. An embodiment of the inventive concept includes the KV storage device according to statement 24, wherein the key logger sends the second location to the host based at least in part on receiving an iterate request from the host.

Statement 26. An embodiment of the inventive concept includes a method, comprising:

receiving a request at a Key-Value (KV) storage device from a host, the request including at least an operation and a key, the operation including at least one of a write operation or a delete operation;

processing the request using a first storage of the KV storage device based at least in part on the operation and the key, thereby determining a location in the first storage associated with the key;

updating a main index structure of the KV storage device based at least in part on the operation, the key, and the location;

logging the operation and the key in a log block of the KV storage device; and returning a result of the request to the host from the KV storage device.

Statement 27. An embodiment of the inventive concept includes the method according to statement 26, wherein logging the operation and the key in the log block of the KV storage device includes logging the location in the log block of the KV storage device.

Statement 28. An embodiment of the inventive concept includes the method according to statement 26, wherein the KV storage device includes a KV Solid State Drive (SSD).

Statement 29. An embodiment of the inventive concept includes the method according to statement 26, wherein receiving the request at the KV storage device from the host, processing the request using the first storage of the KV storage device, updating the main index structure of the KV storage device based at least in part on the operation, the key, and the location, and logging the operation and the key in the log block of the KV storage device are processed as an atomic operation.

Statement 30. An embodiment of the inventive concept includes the method according to statement 26, wherein:

the request further includes a key group metadata; and logging the operation and the key in the log block of the KV storage device includes logging the operation and the key in one of at least two log blocks of the KV storage device based at least in part on the key group metadata.

Statement 31. An embodiment of the inventive concept includes the method according to statement 26, further comprising:

receiving an iterate request, wherein the iterate request is distinct from a read request;

reading the key from the log block; and returning the key.

Statement 32. An embodiment of the inventive concept includes the method according to statement 31, wherein:

reading the key from the log block includes reading a location from the log block; and returning the key includes returning the location.

Statement 33. An embodiment of the inventive concept includes the method according to statement 31, further comprising:

receiving a log-delete request, wherein the log-delete request is distinct from a delete request; and deleting the log block from the KV storage device.

Statement 34. An embodiment of the inventive concept includes the method according to statement 26, further comprising:

receiving an iterate request, wherein the iterate request is distinct from a read request;

identifying a second key associated with the log block; and returning the second key.

Statement 35. An embodiment of the inventive concept includes a method, comprising:

requesting a key from a log block on a Key-Value (KV) storage device;

receiving the key from the KV storage device; and generating a secondary index structure based at least in part on the key, the secondary index structure sorted according to at least the key and a second key, wherein the secondary index structure is distinct from a main index structure used by the KV storage device to process a read request including the key, a write request including the key, or a delete request including the key.

Statement 36. An embodiment of the inventive concept includes the method according to statement 35, wherein:

requesting the key from the log block on the KV storage device includes requesting a location from the log block on the KV storage device;

receiving the key from the KV storage device includes receiving the location from the KV storage device; and generating a secondary index structure based at least in part on the key includes generating the secondary index structure based at least in part on the key and the location.

Statement 37. An embodiment of the inventive concept includes the method according to statement 35, wherein the KV storage device includes a KV Solid State Drive (SSD).

Statement 38. An embodiment of the inventive concept includes the method according to statement 35, wherein the secondary index structure includes at least one of a B+-tree, a B-tree, a slotted page, or a Skip List.

Statement 39. An embodiment of the inventive concept includes the method according to statement 35, wherein:

requesting the key from the log block on the KV storage device includes requesting the key from the log block on the KV storage device by a host;

receiving the key from the KV storage device includes receiving the key at the host at the host from the KV storage device; and generating the secondary index structure includes generating the secondary index structure on the host based at least in part on the key.

Statement 40. An embodiment of the inventive concept includes the method according to statement 39, wherein receiving the key at the host at the host from the KV storage device includes:

receiving a second key associated with the log block at the host from the KV storage device;

requesting the log block from the KV storage device using the second key by the host;

receiving the log block at the host from the KV storage device; and accessing the key from the log block by the host.

Statement 41. An embodiment of the inventive concept includes the method according to statement 35, wherein:

requesting the key from the log block on the KV storage device includes requesting the key from the log block on the KV storage device by a processor of the KV storage device;

receiving the key from the KV storage device includes receiving the key at the processor of the KV storage device; and generating the secondary index structure includes generating the secondary index structure on the processor of the KV storage device based at least in part on the key.

Statement 42. An embodiment of the inventive concept includes the method according to statement 41, wherein:

requesting the key from the log block on the KV storage device by a processor of the KV storage device includes accessing a location for the log block on the KV storage device;

receiving the key at the processor of the KV storage device includes reading the key from the location for the log block on the KV storage device.

Statement 43. An embodiment of the inventive concept includes the method according to statement 35, wherein generating the secondary index structure based at least in part on the key includes merging the key with an second secondary index structure.

Statement 44. An embodiment of the inventive concept includes the method according to statement 43, wherein the second secondary index structure is stored in a memory.

Statement 45. An embodiment of the inventive concept includes the method according to statement 44, wherein generating the secondary index structure based at least in part on the key further includes reading the second secondary index structure from the KV storage device into the memory.

Statement 46. An embodiment of the inventive concept includes the method according to statement 43, generating the secondary index structure based at least in part on the key further includes requesting that the log block be deleted from the KV storage device.

Statement 47. An embodiment of the inventive concept includes the method according to statement 46, wherein requesting that the log block be deleted from the KV storage device includes sending a request from a host to the KV storage device to delete the log block from the KV storage device.

Statement 48. An embodiment of the inventive concept includes the method according to statement 46, wherein requesting that the log block be deleted from the KV storage device includes deleting the log block from the KV storage device.

Statement 49. An embodiment of the inventive concept includes the method according to statement 43, generating the secondary index structure based at least in part on the key further includes writing the secondary index structure to the KV storage device.

Statement 50. An embodiment of the inventive concept includes an article, comprising a non-transitory storage medium, the non-transitory storage medium having stored thereon instructions that, when executed by a machine, result in:

receiving a request at a Key-Value (KV) storage device from a host, the request including at least an operation and a key, the operation including at least one of a write operation or a delete operation;

processing the request using a first storage of the KV storage device based at least in part on the operation and the key, thereby determining a location in the first storage associated with the key;

updating a main index structure of the KV storage device based at least in part on the operation, the key, and the location;

logging the operation and the key in a log block of the KV storage device; and returning a result of the request to the host from the KV storage device.

Statement 51. An embodiment of the inventive concept includes the article according to statement 50, wherein logging the operation and the key in the log block of the KV storage device includes logging the location in the log block of the KV storage device.

Statement 52. An embodiment of the inventive concept includes the article according to statement 50, wherein the KV storage device includes a KV Solid State Drive (SSD).

Statement 53. An embodiment of the inventive concept includes the article according to statement 50, wherein receiving the request at the KV storage device from the host, processing the request using the first storage of the KV storage device, updating the main index structure of the KV storage device based at least in part on the operation, the key, and the location, and logging the operation and the key in the log block of the KV storage device are processed as an atomic operation.

Statement 54. An embodiment of the inventive concept includes the article according to statement 50, wherein:

the request further includes a key group metadata; and logging the operation and the key in the log block of the KV storage device includes logging the operation and the key in one of at least two log blocks of the KV storage device based at least in part on the key group metadata.

Statement 55. An embodiment of the inventive concept includes the article according to statement 50, the non-transitory storage medium having stored thereon further instructions that, when executed by the machine, result in:

receiving an iterate request, wherein the iterate request is distinct from a read request;

reading the key from the log block; and returning the key.

Statement 56. An embodiment of the inventive concept includes the article according to statement 55, wherein:

reading the key from the log block includes reading a location from the log block; and returning the key includes returning the location.

Statement 57. An embodiment of the inventive concept includes the article according to statement 55, the non-transitory storage medium having stored thereon further instructions that, when executed by the machine, result in:

receiving a log-delete request, wherein the log-delete request is distinct from a delete request; and deleting the log block from the KV storage device.

Statement 58. An embodiment of the inventive concept includes the article according to statement 50, the non-transitory storage medium having stored thereon further instructions that, when executed by the machine, result in:

receiving an iterate request, wherein the iterate request is distinct from a read request;

identifying a second key associated with the log block; and returning the second key.

Statement 59. An embodiment of the inventive concept includes an article, comprising a non-transitory storage medium, the non-transitory storage medium having stored thereon instructions that, when executed by a machine, result in:

requesting a key from a log block on a Key-Value (KV) storage device;

receiving the key from the KV storage device; and generating a secondary index structure based at least in part on the key, the secondary index structure sorted according to at least the key and a second key, wherein the secondary index structure is distinct from a main index structure used by the KV storage device to process a read request including the key, a write request including the key, or a delete request including the key.

Statement 60. An embodiment of the inventive concept includes the article according to statement 59, wherein:

requesting the key from the log block on the KV storage device includes requesting a location from the log block on the KV storage device;

receiving the key from the KV storage device includes receiving the location from the KV storage device; and generating a secondary index structure based at least in part on the key includes generating the secondary index structure based at least in part on the key and the location.

Statement 61. An embodiment of the inventive concept includes the article according to statement 59, wherein the KV storage device includes a KV Solid State Drive (SSD).

Statement 62. An embodiment of the inventive concept includes the article according to statement 59, wherein the secondary index structure includes at least one of a B+-tree, a B-tree, a slotted page, or a Skip List.

Statement 63. An embodiment of the inventive concept includes the article according to statement 59, wherein:

requesting the key from the log block on the KV storage device includes requesting the key from the log block on the KV storage device by a host;

receiving the key from the KV storage device includes receiving the key at the host at the host from the KV storage device; and generating the secondary index structure includes generating the secondary index structure on the host based at least in part on the key.

Statement 64. An embodiment of the inventive concept includes the article according to statement 63, wherein receiving the key at the host at the host from the KV storage device includes:

receiving a second key associated with the log block at the host from the KV storage device;

requesting the log block from the KV storage device using the second key by the host;

receiving the log block at the host from the KV storage device; and accessing the key from the log block by the host.

Statement 65. An embodiment of the inventive concept includes the article according to statement 59, wherein:

requesting the key from the log block on the KV storage device includes requesting the key from the log block on the KV storage device by a processor of the KV storage device;

receiving the key from the KV storage device includes receiving the key at the processor of the KV storage device; and generating the secondary index structure includes generating the secondary index structure on the processor of the KV storage device based at least in part on the key.

Statement 66. An embodiment of the inventive concept includes the article according to statement 65, wherein:

requesting the key from the log block on the KV storage device by a processor of the KV storage device includes accessing a location for the log block on the KV storage device;

receiving the key at the processor of the KV storage device includes reading the key from the location for the log block on the KV storage device.

Statement 67. An embodiment of the inventive concept includes the article according to statement 59, wherein generating the secondary index structure based at least in part on the key includes merging the key with an second secondary index structure.

Statement 68. An embodiment of the inventive concept includes the article according to statement 67, wherein the second secondary index structure is stored in a memory.

Statement 69. An embodiment of the inventive concept includes the article according to statement 68, wherein generating the secondary index structure based at least in part on the key further includes reading the second secondary index structure from the KV storage device into the memory.

Statement 70. An embodiment of the inventive concept includes the article according to statement 67, generating the secondary index structure based at least in part on the key further includes requesting that the log block be deleted from the KV storage device.

Statement 71. An embodiment of the inventive concept includes the article according to statement 70, wherein requesting that the log block be deleted from the KV storage device includes sending a request from a host to the KV storage device to delete the log block from the KV storage device.

Statement 72. An embodiment of the inventive concept includes the article according to statement 70, wherein requesting that the log block be deleted from the KV storage device includes deleting the log block from the KV storage device.

Statement 73. An embodiment of the inventive concept includes the article according to statement 67, generating the secondary index structure based at least in part on the key further includes writing the secondary index structure to the KV storage device.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A Key-Value (KV) storage device, comprising:

a first non-transitory storage for data, the first non-transitory storage including a persistent storage;

a second non-transitory storage storing a main index structure mapping a key to a location in the first non-transitory storage storing a value, the key and the value forming a Key-Value pair;

a controller to execute at least one of a read request, a write request, or a delete request using the first non-transitory storage; and a third non-transitory storage storing a secondary index structure storing the key, wherein the secondary index structure is sorted, wherein the secondary index structure is modified based at least in part on the at least one of the read request, the write request, or the delete request; and wherein the KV storage device is configured to receive a range query from a host, to identify a second key and a third key in the secondary index structure that satisfy the range query, and to send the second key and the third key to the host in response to the range query.

2. The KV storage device according to claim 1, further comprising a fourth non-transitory storage storing a log block, the log block including a second key, the second key and a second location stored in the main index structure.

3. The KV storage device according to claim 2, wherein the log block further includes at least one of an identifier of an operation and metadata.

4. The KV storage device according to claim 2, further comprising a key logger to add the second key to the log block based at least in part on at least one of the write request or the delete request, the at least one of the write request or the delete request including the second key.

5. The KV storage device according to claim 4, wherein the key logger retrieves the second key from the log block and sends the second key based at least in part on receiving an iterate request.

6. The KV storage device according to claim 4, wherein the key logger sends a third key associated with the log block.

7. The KV storage device according to claim 4, wherein the key logger deletes the log block based at least in part on receiving a log-delete request.

8. A method, comprising:

receiving a request at a Key-Value (KV) storage device, the request including at least an operation and a key, the operation including at least one of a write operation or a delete operation;

executing the request using a first storage of the KV storage device based at least in part on the operation and the key, thereby determining a location in the first storage associated with the key;

modifying a main index structure of the KV storage device based at least in part on the operation, the key, and the location;

logging the operation and the key in a log block of the KV storage device;

returning a result of the request from the KV storage device;

modifying a secondary index structure based at least in part on the log block;

receiving a range query at the KV storage device;

identifying a second key and a third key in the secondary index structure that satisfy the range query; and responding to the range query from the KV storage device with the second key and the third key.

9. The method according to claim 8, further comprising:

receiving an iterate request, wherein the iterate request is distinct from a read request;

reading the key from the log block; and returning the key.

10. The method according to claim 9, further comprising:

receiving a log-delete request, wherein the log-delete request is distinct from a delete request; and deleting the log block from the KV storage device.

11. The method according to claim 8, further comprising:

receiving an iterate request, wherein the iterate request is distinct from a read request;

identifying a second key associated with the log block; and returning the second key.

12. A method, comprising:

requesting a key by a host from a log block on a Key-Value (KV) storage device;

receiving the key at the host from the KV storage device;

generating, by the host, a secondary index structure based at least in part on the key, the secondary index structure sorted according to at least the key and a second key;

sending the secondary index structure from the host to the KV storage device for storage on the KV storage device;

sending a range query from the host to the KV storage device; and receiving at the host from the KV storage device a second key and a third key in response to the range query;

wherein the secondary index structure is distinct from a main index structure used by the KV storage device to execute a read request including the key, a write request including the key, or a delete request including the key.

13. The method according to claim 12, wherein:

requesting the key by the host from the log block on the KV storage device includes requesting the key by the host from the log block on the KV storage device sent to a processor of the KV storage device;

receiving the key at the host from the KV storage device includes receiving the key at the host from the processor of the KV storage device.

14. The method according to claim 12, wherein generating, by the host, the secondary index structure based at least in part on the key includes merging, by the host, the key with a second secondary index structure.

15. The method according to claim 14, generating, by the host, the secondary index structure based at least in part on the key further includes requesting by the host that the log block be deleted from the KV storage device.

16. The method according to claim 15, wherein requesting by the host that the log block be deleted from the KV storage device includes sending from the host a request to the KV storage device to delete the log block from the KV storage device.

17. The method according to claim 15, wherein requesting by the host that the log block be deleted from the KV storage device includes deleting, by the KV storage device, the log block from the KV storage device.

18. The KV storage device according to claim 1, wherein the second non-transitory storage and the third non-transitory storage may be used to respond to the range query.

19. The method according to claim 12, wherein the main index structure and the secondary index structure may be used to respond to the range query.

20. The KV storage device according to claim 1, wherein the KV storage device is configured to receive an updated secondary index structure from the host and to replace the secondary index structure in the in the third non-transitory storage with the updated secondary index structure.

* * * * *